United States Patent
Koneru et al.

(10) Patent No.: US 11,889,022 B2
(45) Date of Patent: Jan. 30, 2024

(54) SYSTEMS AND METHODS FOR HANDLING CUSTOMER CONVERSATIONS AT A CONTACT CENTER

(71) Applicant: Kore.ai, Inc., Orlando, FL (US)

(72) Inventors: Rajkumar Koneru, Windermere, FL (US); Prasanna Kumar Arikala Gunulan, Hyderabad (IN); Rajavardhan Nalluri, Hyderabad (IN)

(73) Assignee: Kore.ai, Inc., Orlando, FL (US)

( * ) Notice: Subject to any disclaimer, the term of this patent is extended or adjusted under 35 U.S.C. 154(b) by 117 days.

(21) Appl. No.: 17/559,260

(22) Filed: Dec. 22, 2021

(65) Prior Publication Data

US 2023/0199116 A1  Jun. 22, 2023

(51) Int. Cl.
| | |
|---|---|
| H04M 3/493 | (2006.01) |
| H04M 3/51 | (2006.01) |
| G10L 15/06 | (2013.01) |
| G10L 15/22 | (2006.01) |
| G06N 20/00 | (2019.01) |
| G10L 15/18 | (2013.01) |

(52) U.S. Cl.
CPC .......... *H04M 3/4936* (2013.01); *G06N 20/00* (2019.01); *G10L 15/063* (2013.01); *G10L 15/1822* (2013.01); *G10L 15/22* (2013.01); *H04M 3/5175* (2013.01); *G10L 2015/0638* (2013.01); *G10L 2015/227* (2013.01); *G10L 2015/228* (2013.01)

(58) Field of Classification Search
CPC .. H04M 3/4936; H04M 3/5175; G06N 20/00; G10L 15/063; G10L 15/1822; G10L 15/22; G10L 2015/0638; G10L 2015/227; G10L 2015/228
See application file for complete search history.

(56) References Cited

U.S. PATENT DOCUMENTS

| | | |
|---|---|---|
| 8,626,520 B2 | 1/2014 | Cloran |
| 9,336,526 B2 | 5/2016 | Tuchman et al. |
| 9,848,082 B1 | 12/2017 | Lillard et al. |
| 9,876,909 B1 | 1/2018 | Klein et al. |
| 9,992,338 B2 | 6/2018 | Eisner et al. |
| 10,051,123 B2 | 8/2018 | Griesmer et al. |
| 10,055,742 B2 | 8/2018 | Phelps et al. |

(Continued)

FOREIGN PATENT DOCUMENTS

WO   2018033897 A2   2/2018

*Primary Examiner* — Akelaw Teshale
(74) *Attorney, Agent, or Firm* — Troutman Pepper Hamilton Sanders LLP (Rochester)

(57) ABSTRACT

A contact center server receives an utterance from a customer device as part of a conversation. The contact center server identifies utterance parameters of the utterance, generates a first response to the utterance based on the utterance parameters, and outputs the utterance parameters and the first response to an agent device. The contact center server receives agent-identified-information corresponding to the utterance or agent-modified-information corresponding to the utterance parameters from the agent device. Subsequently, the contact center server generates a second response to the utterance based on the agent-identified-information or the agent-modified-information and outputs the second response to the agent device.

21 Claims, 16 Drawing Sheets

(56) References Cited

U.S. PATENT DOCUMENTS

| | | |
|---|---|---|
| 10,218,651 B2 | 2/2019 | Schubert et al. |
| 10,733,614 B2 | 8/2020 | Sapoznik et al. |
| 10,750,019 B1 | 8/2020 | Petrovykh et al. |
| 10,764,435 B2 | 9/2020 | Deole |
| 10,776,580 B2 | 9/2020 | Kim et al. |
| 10,791,222 B2 | 9/2020 | Jiron et al. |
| 10,965,811 B1 | 3/2021 | Shi et al. |
| 10,970,485 B1 | 4/2021 | Shi et al. |
| 10,999,434 B1 | 5/2021 | Andar et al. |
| 11,030,412 B2 | 6/2021 | Shanmugam et al. |
| 11,049,497 B1 | 6/2021 | Shi et al. |
| 2014/0244249 A1 | 8/2014 | Mohamed et al. |
| 2014/0344169 A1* | 11/2014 | Phelps ................. G06Q 30/016 705/304 |
| 2019/0132443 A1* | 5/2019 | Munns ................. H04M 3/2227 |
| 2020/0097608 A1 | 3/2020 | Xiu et al. |
| 2021/0004536 A1 | 1/2021 | Adibi et al. |
| 2021/0043099 A1 | 2/2021 | Du et al. |
| 2021/0126881 A1 | 4/2021 | Ball et al. |
| 2021/0136209 A1 | 5/2021 | Adibi et al. |
| 2021/0142291 A1 | 5/2021 | Laxman et al. |
| 2021/0157989 A1* | 5/2021 | Orr ......................... G06F 40/35 |
| 2021/0160371 A1 | 5/2021 | McGann et al. |
| 2021/0160372 A1* | 5/2021 | McGann ............. H04M 3/5175 |
| 2021/0160373 A1* | 5/2021 | McGann ............. H04M 3/5175 |
| 2022/0407925 A1* | 12/2022 | Zanfolim ............. H04L 67/141 |

* cited by examiner

SYSTEMS AND METHODS FOR HANDLING CUSTOMER CONVERSATIONS AT A CONTACT CENTER

FIELD

This technology generally relates to contact centers, and more particularly to methods, systems, and computer-readable media for assisting customers using a virtual assistant and a human agent.

BACKGROUND

Traditionally, enterprises use interactive voice response (IVR) systems as a first touch point for customer issue resolution. These IVR systems are not intelligent, include complicated, long-winded menu trees and often result in the customer requesting a call transfer to a human agent for issue resolution. This results in the customers at one or more of the customer devices spending a substantial amount of time on call, initially navigating the IVR and subsequently waiting to connect to the human agent. The high volume of calls transferred from the IVR systems to the human agents at one or more of the agent devices increases the contact center costs. The human agents at one or more of the agent devices may also lack the expertise to resolve the issue and transfer the call to a supervisor, further adversely affecting the customer experience.

Recently, enterprises are employing automated response systems (e.g., virtual assistants, chatbots, or the like) to serve their customers. In one example, enterprises exclusively use virtual assistants for customer care. The customers at one or more of the customer devices can interact with virtual assistants of the enterprise using voice or text to access information, complete tasks, and execute transactions. The virtual assistants replace complicated menu mazes with natural language processing, machine learning, and other forms of intelligence to understand the content and context of customer requests, enabling a free-form and dynamic customer experience. Although the virtual assistants may effectively handle simple requests, they may not always be able to handle and resolve complex customer requests.

The virtual assistants may also escalate the complex requests to a human agent for resolution. In this example, the human agent needs to read through the conversation transcript between the virtual assistant and the customer to understand the context, intent, and problems of the customer. This is a time-consuming activity and affects the resolution time and customer satisfaction.

Thus, the drawbacks of the existing approaches may result in customers: expressing dissatisfaction and negative sentiment; providing a low rating; abandoning conversations; or the like, which in turn affect the key performance indicators (KPIs) of the contact center such as—customer satisfaction score (CSAT), customer effort score (CES), net promoter score (NPS), average handling time (AHT) of a request, first-call resolution, service level, contact quality, or the like. Hence, there is a need to improve the handling of customer interactions in contact centers.

SUMMARY

An example method for handling customer conversations at a contact center comprises receiving, by a contact center server, an utterance from a customer device as part of a conversation. The contact center server identifies utterance parameters of the utterance and generates a first response to the utterance based on the utterance parameters. The contact center server outputs the utterance parameters and the first response to an agent device. Subsequently, the contact center server receives from the agent device agent-identified-information corresponding to the utterance or agent-modified-information corresponding to the utterance parameters. The contact center server generates a second response to the utterance based on the agent-identified-information or the agent-modified-information and outputs the second response to the agent device.

In another example, a contact center server comprises a processor and a memory coupled to the processor which is configured to be capable of executing programmed instructions stored in the memory to receive an utterance from a customer device as part of a conversation and identify utterance parameters of the utterance. A first response to the utterance based on the utterance parameters is generated and the utterance parameters and the first response are output to an agent device. Subsequently, agent-identified-information corresponding to the utterance or agent-modified-information corresponding to the utterance parameters is received from the agent device. A second response to the utterance is generated based on the agent-identified-information or the agent-modified-information and the second response is output to the agent device.

In another example, a non-transitory computer-readable medium having stored thereon instructions which when executed by a processor, causes the processor to receive an utterance from a customer device as part of a conversation and identify utterance parameters of the utterance. A first response to the utterance based on the utterance parameters is generated and the utterance parameters and the first response are output to an agent device. Subsequently, agent-identified-information corresponding to the utterance or agent-modified-information corresponding to the utterance parameters is received from the agent device. A second response to the utterance is generated based on the agent-identified-information or the agent-modified-information and the second response is output to the agent device.

DETAILED DESCRIPTION

Examples of the present disclosure relate to a contact center environment and, more particularly, to one or more components, systems, computer-readable media and methods of the contact center environment. The contact center environment is configured to assist contact center agents, hereinafter referred to as "human agents", using a virtual assistant at a computing device, by way of example, to provide faster and efficient assistance to customers who get in touch with the contact center. In one example, the virtual assistant may assist the human agent by—suggesting responses to be sent to the customer or actions to be taken, based on the conversation between the human agent and the customer.

Figure 1:
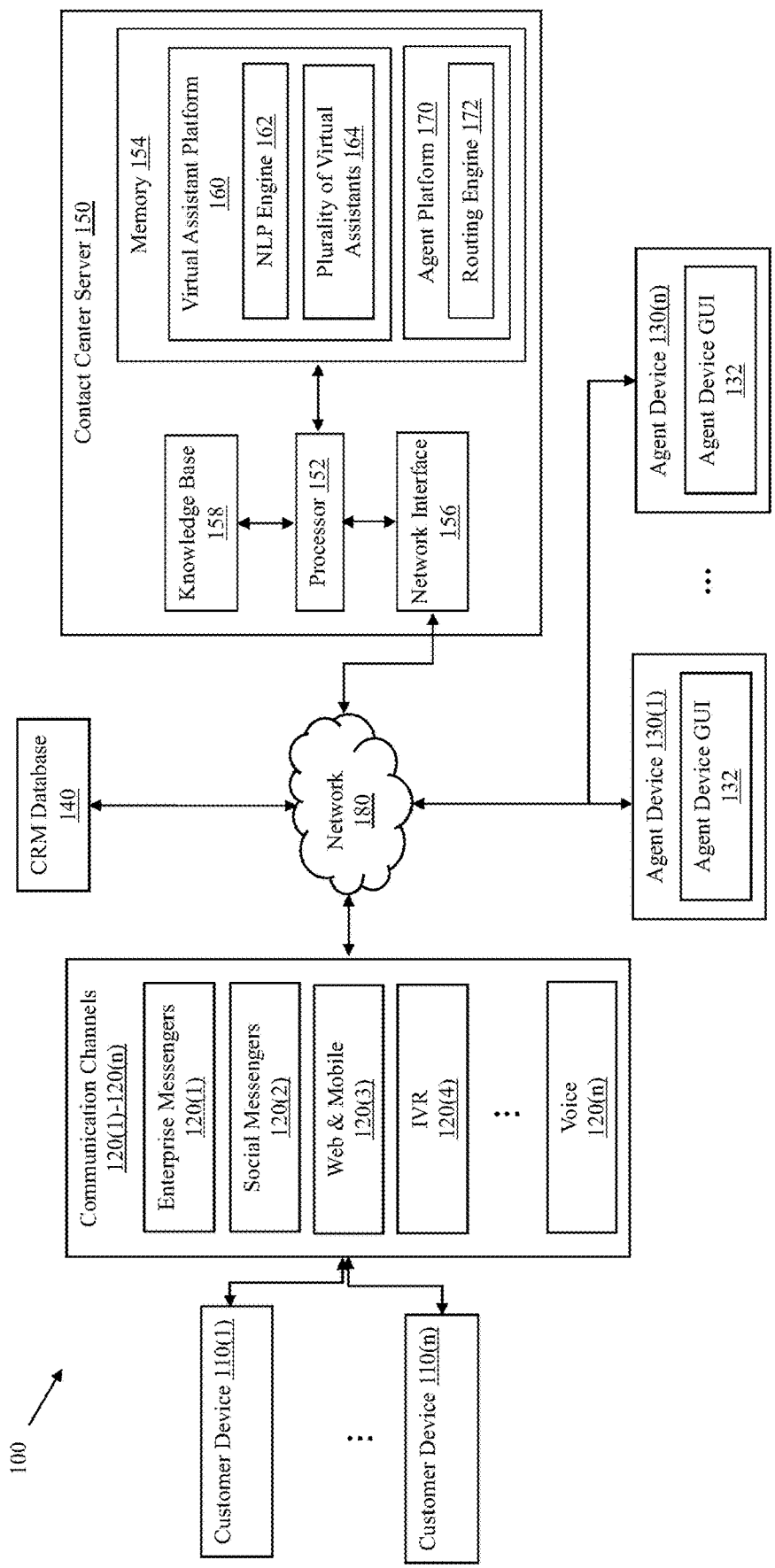
FIG. 1 is a block diagram of an exemplary contact center environment for implementing the concepts and technologies disclosed herein.

FIG. 1 is a block diagram of an exemplary contact center environment 100 for implementing the concepts and technologies disclosed herein. The environment 100 includes: a plurality of customer devices 110(1)-110(n), a plurality of communication channels 120(1)-120(n), a plurality of agent devices 130(1)-130(n), a customer relationship management (CRM) database 140, a contact center server 150 coupled together via a network 180, although the environment 100 can include other types and numbers of systems, devices, components, and/or elements and in other topologies and deployments. While not shown, the exemplary environment 100 may include additional network components, such as routers, switches and other devices, which are well known to those of ordinary skill in the art and thus will not be described here.

Referring to FIG. 1, the contact center server 150 handles issues of customers reaching the contact center server 150 via voice and digital channels. The contact center server 150 may use automation and artificial intelligence (e.g. virtual assistants), human agents, or a combination of these to resolve customer issues. In one example, the customer conversation may be directly assigned to a human agent. In another example, the customer conversation may be initially handled by the virtual assistant and then transferred to the human agent at a later point in the conversation when intervention of the human agent is required. The customer conversation may be transferred from the human agent to the virtual assistant when the intervention of the human agent is no longer required. In another example, the human agent may handle the conversation with the customer and the virtual assistant may provide suggestions to the human agent to handle the conversation.

The contact center server 150 includes a processor 152, a memory 154, a network interface 156 and a knowledge base 158, although the contact center server 150 may include other types and/or numbers of components in other configurations. In addition, the contact center server 150 may include an operating system (not shown). In one example, the contact center server 150 and/or processes performed by it may be implemented using a networking environment (e.g., cloud computing environment). In one example, the contact center server 150 may be offered as a service by the cloud computing environment.

The components of the contact center server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these.

The processor(s) 152 of the contact center server 150 may execute one or more computer-executable instructions stored in memory 154 for the methods illustrated and described with reference to the examples herein, although the processor can execute other types and numbers of instructions and perform other types and numbers of operations. The processor(s) 152 may comprise one or more central processing units (CPUs), or general-purpose processors with a plurality of processing cores, such as Intel® processor(s), AMD® processor(s), although other types of processor(s) could be used in other configurations.

The memory 154 of the contact center server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 may include instructions corresponding to a virtual assistant platform 160 and an agent platform 170 of the contact center server 150, although other types and/or numbers of instructions in the form of programs, functions, methods, procedures, definitions, subroutines, or modules may be stored. The contact center server 150 receives communication from the plurality of customer devices 110(1)-110(n) and uses the virtual assistant platform 160 or the agent platform 170 to provide a response to the communication.

The network interface 156 may include hardware, software, or a combination of hardware and software, enabling the contact center server 150 to communicate with the components illustrated in the environment 100, although the network interface 156 may enable communication with other types and/or number of components in other configurations. In one example, the network interface 156 provides interfaces between the contact center server 150 and the network 180. The network interface 156 may support wired or wireless communication. In one example, the network interface 156 may include an Ethernet adapter or a wireless network adapter to communicate with the network 180.

The plurality of customer devices 110(1)-110(n) may communicate with the contact center server 150 via the network 180. The customers at one or more of the customer devices 110(1)-110(n) may access and interact with the functionalities exposed by the contact center server 150 via the plurality of customer devices 110(1)-110(n). The plurality of customer devices 110(1)-110(n) can include any type of computing device that can facilitate customer interaction, for example, a desktop computer, a laptop computer, a tablet computer, a smartphone, a mobile phone, a wearable computing device, or any other type of device with communication and data exchange capabilities. The plurality of customer devices 110(1)-110(n) may include software and hardware capable of communicating with the contact center server 150 via the network 180. Also, the plurality of customer devices 110(1)-110(n) may render and display the information received from the contact center server 150. The plurality of customer devices 110(1)-110(n) may render an interface of any of the plurality of communication channels 120(1)-120(n) which the customers may use to communicate with the contact center server 150. The plurality of customer devices 110(1)-110(n) and the contact center server 150 may communicate via one or more application programming interfaces (APIs) or one or more hyperlinks exposed by the contact center server 150.

The customers at one or more of the customer devices 110(1)-110(n) may communicate with the contact center server 150 by providing a text utterance or a voice utterance via any of the plurality of communication channels 120(1)-120(n). The plurality of communication channels 120(1)-120(n) may include channels such as, for example, enterprise messengers 120(1) (e.g., Skype for Business, Microsoft Teams, Kore.ai Messenger, Slack, Google Hangouts, or the like), social messengers 120(2) (e.g., Facebook Messenger, WhatsApp Business Messaging, Twitter, Lines, Telegram, or the like), web & mobile 120(3) (e.g., a web application, a mobile application), interactive voice response (IVR) 120(4), voice channels 120(n) (e.g., Google Assistant, Amazon Alexa, or the like), live chat channels (e.g., LivePerson, LiveChat, Zendesk Chat, Zoho Desk, or the like), a webhook, a short messaging service (SMS), email, a software-as-a-service (SaaS) application, voice over internet protocol (VoIP) calls, computer telephony calls, or the like. The customers may communicate with the contact center server 150 via any of the plurality of communication channels 120(1)-120(n) using any of the plurality of customer devices 110(1)-110(n) via the network 180. It may be understood that to support voice-based communication channels, the environment 100 may include, for example, a public switched telephone network (PSTN), a voice server, a text-to-speech (TTS) engine, and an automatic speech recognition (ASR) engine, which are not illustrated in FIG. 1.

The human agents may operate the plurality of agent devices 130(1)-130(n) to interact with the contact center server 150, the CRM database 140, or the plurality of customer devices 110(1)-110(n) via the network 180. In one example, the plurality of agent devices 130(1)-130(n) may access the knowledge base 158 and the CRM database 140 via one or more application programming interfaces (APIs) or one or more hyperlinks or one or more uniform resource locators (URLs). The plurality of agent devices 130(1)-130(n) may be, for example, a desktop computer, a laptop computer, a tablet computer, a smartphone, a mobile phone, or any other type of device with communication and data exchange capabilities. Also, the plurality of agent devices 130(1)-130(n) comprise an agent device graphical user interface (GUI) 132 that may render and display data received from the contact center server 150 or the plurality of customer devices 110(1)-110(n). The plurality of agent devices 130(1)-130(n) may run applications such as web browsers or contact center software, which may render the agent device GUI 132, although other applications may render the agent device GUI 132.

The plurality of customer devices 110(1)-110(n) or the plurality of agent devices 130(1)-130(n) may include one or more processors, one or more memories, one or more input devices such as a keyboard, a mouse, a display device, a touch interface, and/or one or more communication interfaces, which may be coupled together by a bus or other link, although each may have other types and/or numbers of other systems, devices, components, and/or other elements.

The network 180 may enable the plurality of customer devices 110(1)-110(n), the plurality of agent devices 130(1)-130(n), the CRM database 140, or other such devices to communicate with the contact center server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 180 may also support standards and/or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the contact center server 150 may include any interface that is suitable to connect with any of the above-mentioned network types and communicate using any of the above-mentioned network protocols.

The CRM database 140 may store information related to customers including profile details (e.g., name, address, phone numbers, sex, age, occupation, etc.), communication channel preference (e.g. text chat, SMS, voice chat, multimedia chat, social networking chat, web, telephone call, etc.), language preference, membership information (e.g., membership ID, membership category), and transaction data (e.g., communication session details such as: date, time, call handle time, issue type, transcripts, or the like). Further, the CRM database 140 may also store other information of previous customer interactions such as: sentiment, emotional state, call deflection, feedback and ratings, or the like. Although depicted as an external component in FIG. 1, in one example, the CRM database 140 may be a part of the contact center server 140.

The CRM database 140 may be updated dynamically or periodically based on the customer conversations with the contact center or the human agents at one or more of the agent devices 130(1)-130(n). In one example, the CRM database 140 may be updated with customer interaction information such as, for example, attributes of the customer who called (e.g., customer name, address, phone number, email), attributes of the human agent who took the call (e.g., agent name, agent identifier), call time, call date, total call handle time, call issue type handled, conversation transcript, customer emotion states, or customer feedback, to the CRM database 140 for future reference, although other types and/or numbers of information may be updated to the CRM database 140.

The knowledge base 158 of the contact center server 150 may be a product-specific database, domain-specific database, or a combination of both that includes information about certain products and services in the form of, for example, frequently asked questions (FAQs), documents (e.g., articles, books, magazines), online content, hyperlinks, audio/video data, and/or graphical data that may be organized as relational data, tabular data, knowledge graph, or the like. The knowledge base 158 may be accessed by the human agents at one or more of the agent devices 130(1)-130(n), the virtual assistant platform 160, or the agent platform 170 to resolve customer issues. The human agent at one of the agent devices 130(1)-130(n) may search the knowledge base 158, for example, using the agent device GUI 132. The knowledge base 158 may be used to improve the productivity and quality of human agent responses. The knowledge base 158 may be a dynamically updatable database. The knowledge base 158 may comprise a number of different databases, some of which may be internal or external to the contact center server 150. Although there may be multiple databases, a single knowledge base 158 is illustrated in FIG. 1 for simplicity.

Figure 2:
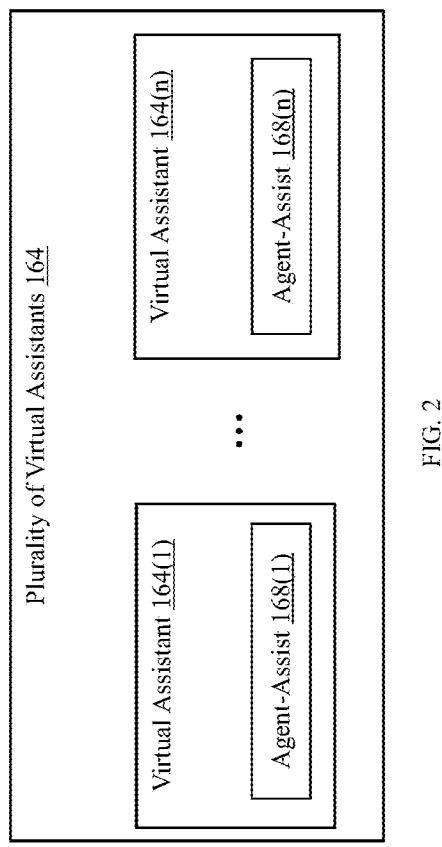
FIG. 2 is a block diagram of a plurality of virtual assistants of the contact center environment illustrated in FIG. 1.

Further, the memory 154 of the contact center server 150 may include a virtual assistant platform 160 and an agent platform 170. The agent platform 170 and the virtual assistant platform 160 may be connected with each other using middleware. An enterprise user such as a developer or a business analyst may create or configure a virtual assistant using the virtual assistant platform 160. The virtual assistant may be based on artificial intelligence and configured to communicate with the customers at one or more of the customer devices 110(1)-110(n) or the human agents at one or more of the agent devices 130(1)-130(n). The virtual assistant platform 160 may host a plurality of virtual assistants 164(1)-164(n) deployed by one or more enterprises. The virtual assistant platform 160 includes a natural language processing (NLP) engine 162 and a plurality of virtual assistants 164(1)-164(n), although the virtual assistant platform 160 may include other types and/or numbers of components in other configurations. The contact center server 150 may use the plurality of virtual assistants 164(1)-164(n), as illustrated in FIG. 2, to handle omni-channel conversations with customers.

The contact center server 150 feeds utterances received from the plurality of customer devices 150(1)-150(n) to the virtual assistant platform 160. The NLP engine 162 interprets the received utterance and determines intents of the utterances and extract entities of the utterances. In one example, the NLP engine 162 may use machine learning techniques, semantic rules, component relationships, business rules, or the like to determine intents and extract entities from the utterance. When an intent is detected by the NLP engine 162, a corresponding dialog flow of one of the plurality of virtual assistants 164(1)-164(n) may be executed by the virtual assistant platform 160 to generate a response to the customer's input utterance and output the response to the customer.

The agent platform 170 of the contact center server 150 facilitates communication between the contact center server 150 and the plurality of agent devices 130(1)-130(n). The agent platform 170 includes a routing engine 172 which handles routing communication to the plurality of agent devices 130(1)-130(n), although the agent platform 170 may include other types and/or numbers of components in other configurations. In one example, the agent platform 170 manages transferring a communication session handled using one of the plurality of virtual assistants 164(1)-164(n) to one or more of the plurality of agent devices 130(1)-130(n). In another example, messages from the contact center server 150 may be output to the plurality of agent devices 130(1)-130(n) via the agent platform 170. The routing engine 172 may be configured with artificial intelligence including predictive models, or rules to route customer conversations to human agents. The routing engine 172 may use agent skills, conversation type, or the like to route customer conversations.

The routing engine 172 assigns a customer conversation that requires human agent intervention to an available human agent operating the one or more agent devices 130(1)-130(n) based on one or more assignment parameters. The one or more assignment parameters may include, for example: (1) path navigated by the customer in an IVR menu, (2) current emotion state of the customer (e.g., angry, frustrated, cool, neutral, etc), (3) behavioral history information of the customer collected and saved each time when the customer previously contacted the contact center (e.g., call/chat abandonments, prefers to talk to a human agent, etc), (4) feedback ratings given by the customer for the services received during previous contact center interactions, (5) account type of the customer (e.g., platinum, gold, silver etc), (6) customer waiting time in the queue, (7) availability of the one or more human agents, (8) skill set and level of the available human agents, (9) average waiting time in the human agent queue, or the like. In one example, the routing engine 172 may retrieve data regarding skill set and level of the human agents at one or more of the agent devices 130(1)-130(n) stored in a database of the contact center server 150. The retrieved data may be used in transferring the customer conversation to one of the available human agents. In another example, if no human agent is available to handle the customer conversation, the routing engine 172 may place the customer conversation in a common queue until one or more human agents are available to take over the conversation. In an example, the common queue may be defined as a data structure maintained by the routing engine 172 to hold customer conversations that need to be transferred to available human agents for service. The routing engine 172 may comprise a programming module or one or more routing algorithms executed by the processor 152 to perform the routing functions based on the one or more factors disclosed above.

Further, in view of FIG. 1, once the customer conversation is transferred to the human agent operating one of the plurality of agent devices 130(1)-130(n), the contact center server 150 may provide the conversation transcript of the conversation to the human agent, so that the human agent can read-through to understand the intent of the customer. In one example, the virtual assistant platform 160 of the contact center server 150 may assist the human agent by suggesting one or more responses and/or actions to a customer utterance. In another example, the virtual assistant platform 160 may assist the human agent by providing one or more intents, one or more entities, or one or more entity values corresponding to the one or more entities that are captured from the customer utterance. In another example, when a confidence score of captured intents is less than a threshold value, the virtual assistant platform 160 may provide one or more suggested intents to the human agent based on the utterance of the customer.

An intent may be defined as a purpose of the customer. The intent of the customer may be determined from an utterance provided by the customer and fulfilled by the contact center using one or more virtual assistants, one or more human agents, or a combination of one or more virtual assistants and one or more human agents. Example intents include: book flight, book train, book cab, book movie ticket, restaurant search, ecommerce search, check balance, document search, or the like. To fulfill the intent, the virtual assistant platform 160 may need one or more entities defined by entity parameters including: an entity name, an entity type, an entity value, or the like, although there may be other types and/or numbers of entity parameters in other configurations. In an example, entity types may include: airport, address, city, company name, color, currency, product category, date, time, location, place name, etc. For example, in an utterance "Book flight tickets from San Diego to New York", the intent of the customer is "book flight". "San Diego" and "New York" are the entity values whose entity type is "city".

FIG. 2 is a block diagram of the plurality of virtual assistants 164(1)-164(n) of the contact center environment 100 illustrated in FIG. 1. Each of the plurality of virtual assistants 164(1)-164(n) may include rules, dialog flows, neural networks, or artificial intelligence based definitions, models or instructions. In one example, the enterprise user may create a dialog flow for each intent supported by the virtual assistant 164(1). The dialog flows may comprise a network of nodes connected using conditions that define a sequence of steps to be executed in order to fulfil the intent of the customer. For example, different dialog flows defined for a travel virtual assistant may comprise book flight, book train, book lounge, book cab, book hotel, etc. In one example, the virtual assistant 164(1) may access the CRM database 140 and/or the knowledge base 118 to generate the response. Example dialog flow of a "book flight" intent defined for the travel virtual assistant is described further below in the description with respect to FIG. 7. The enterprise user may configure or enable one or more of the plurality of communication channels 120(1)-120(n) for each of the plurality of virtual assistants 164(1)-164(n). The customers at one or more of the customer devices 110(1)-110(n) of the enterprise can use any of the enabled plurality of communication channels 120(1)-120(n) to communicate with the contact center server 150.

The virtual assistant platform 160 may escalate the conversation to a human agent when required. The plurality of virtual assistants 164(1)-164(n) include agent-assist 168(1)-168(n) functionality which the plurality of virtual assistants 164(1)-164(n) may use to assist the human agents at one or more of the agent devices 130(1)-130(n) by accessing customer utterances provided to the human agents at one or more of the agent devices 130(1)-130(n) and suggesting responses or actions to the customer utterances. The suggested responses or actions may be used by the human agents at one or more of the agent devices 130(1)-130(n) or sent as-is or after modifications to the customers at one or more of the customer devices 110(1)-110(n). In one example, the agent-assist 168(1)-168(n) may be implemented using machine learning, neural network, or other artificial intelligence based techniques.

In one example, the agent-assist 168(1)-168(n) may include one or more dialog flows which are executed upon an intent match. For further illustration, the dialog flows of the virtual assistant 164(1) may be of three types: dialog flows which may be executed by the virtual assistant platform 160 when the customer is conversing with the virtual assistant 164(1), dialog flows which may be executed by the virtual assistant platform 160 when the customer is conversing with the human agent, or dialog flows which may be executed by the virtual assistant platform 160 when customer is conversing with the virtual assistant 164(1) or the human agent. Although FIG. 2 illustrates each of the plurality of virtual assistants 164(1)-164(n) including agent-assist 168(1)-168(n), it may be understood that one or more of the plurality of virtual assistants 164(1)-164(n) may not include the agent-assist 168(1)-168(n) functionality.

Figure 3A:
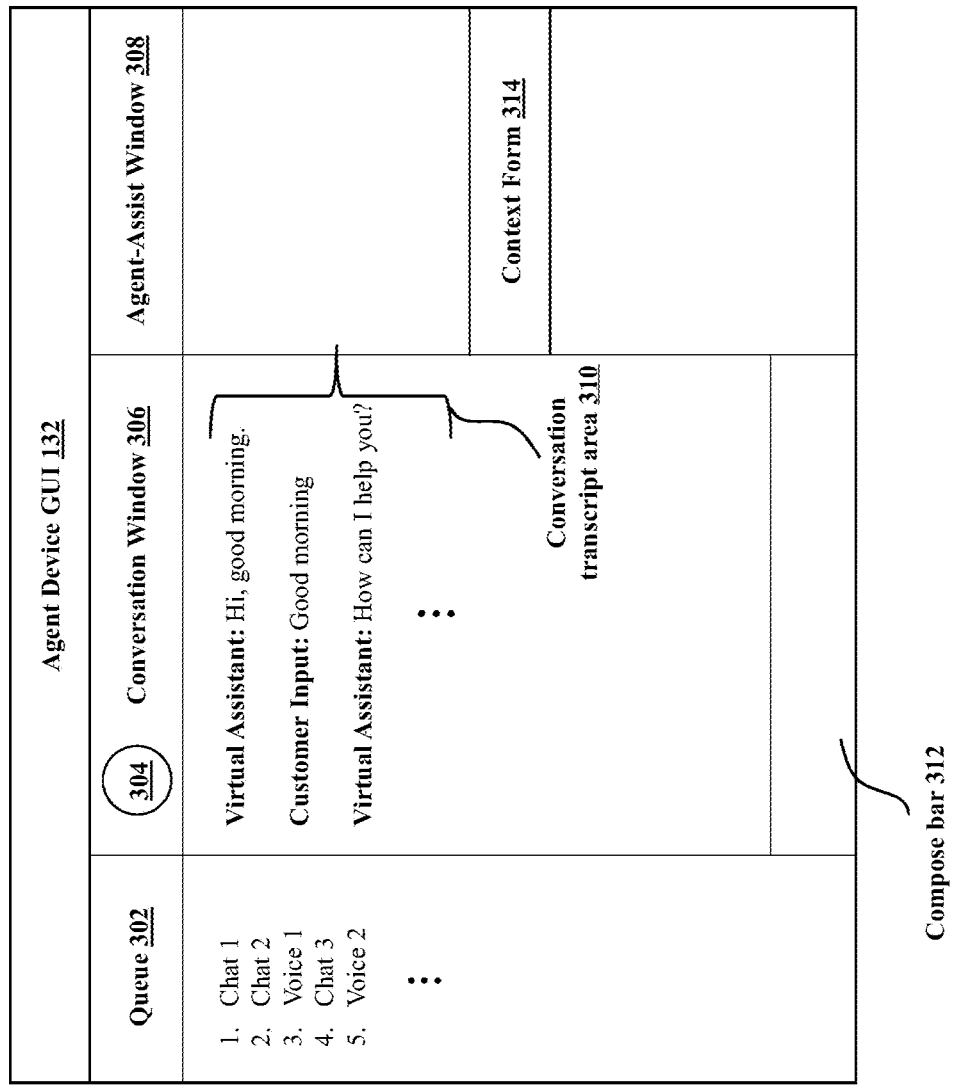
FIG. 3A is an example wireframe of a graphical user interface that is provided to a human agent.

FIG. 3A illustrates an example wireframe of the agent device GUI 132 displayed in one of the plurality of agent devices 130(1)-130(n). The agent device GUI 132 may be displayed using a contact center software executable on the one of the plurality of agent devices 130(1)-130(n), or a web page provided by the contact center server 150 and rendered in a browser executable on the one of the plurality of agent devices 130(1)-130(n), although the agent device GUI 132 may be displayed by other types and/or numbers of applications in other configurations. The contact center software or the web page provided by the contact center server 150 enables the human agents at one or more of the agent devices 130(1)-130(n) to: communicate with the customers at one or more of the customer devices 110(1)-110(n), view information related to the customers or customer conversations, receive response suggestions or actions provided by the virtual assistant platform 160, search or retrieve information from the CRM database 140 or the knowledge base 158, or communicate with third-party applications databases, although other types and/or numbers of functions may be enabled. Further, the contact center software or the web page provided by the contact center server 150 allows the contact center server 150 to record interactions between the customers at one or more of the customer devices 110(1)-110(n) and the human agents at one or more of the agent devices 130(1)-130(n), and monitor performance of the human agents at one or more of the agent devices 130(1)-130(n).

As illustrated in FIG. 3A, the GUI 132 may include a queue window 302, a profile icon 304, a conversation window 306, an agent-assist window 308, and a context form 314, although other types and/or numbers of windows, panels, or widgets may be included in other configurations. The queue window 302 may show a list of conversations (e.g., chat 1, chat 2, voice 1, chat 3, voice 2, etc.) that are transferred to the human agent by the contact center server 150. The list of conversations in the queue window 302 may be addressed or monitored by the human agent at one of the agent devices 130(1)-130(n) on a first-come-first-serve basis.

The conversations in the queue window 302 may be prioritized based on one or more prioritization parameters, so that the human agent at one of the agent devices 130(1)-130(n) handles the conversations that need to be addressed on priority. The prioritization parameters may include at least one of, for example, a customer type (e.g., premium customer, new customer), urgency of the request, service policy of the request (e.g., time within which the request has to be handled), customer emotional state (e.g., angry, frustrated, neutral, positive), number of times the request has been transferred, wait and hold times of the customer in the common queue and/or the queue window 302 (e.g. human agent queue), customer contact frequency to the contact center, or the like. When the human agent at one of the agent devices 130(1)-130(n) selects a conversation in the queue window 302, the details related to the selected conversation, such as a customer profile or a conversation transcript, may be displayed in the conversation window 306.

The conversation window 306 may include a profile icon 304 of the customer, a conversation transcript area 310, and a compose bar 312 for the human agent at one of the agent devices 130(1)-130(n) to compose and send a response to the customer during the conversation. The human agent at one of the agent devices 130(1)-130(n) may access the profile of the customer by clicking on the customer profile icon 304. For example, when the human agent at one of the agent devices 130(1)-130(n) clicks on the customer profile icon 304, the profile of the customer may be retrieved from the CRM database 140 and provided to the human agent at one of the agent devices 130(1)-130(n). In another example, the profile of the customer may be automatically retrieved from the CRM database 140 and provided to the human agent at one of the agent devices 130(1)-130(n) in the conversation transcript area 310, when the human agent at one of the agent devices 130(1)-130(n) selects the conversation in the queue window 302.

The profile of the customer may include information about the customer, such as, for example, name, address, contact details, and/or account details of the customer. The customer information may be retrieved from the CRM database 140 based on: a customer telephone/mobile number from which the customer contacted the contact center, customer identifier, or the like. In the conversation transcript area 310, the human agent at one of the agent devices 130(1)-130(n) may view the transcript of a conversation with the customer orchestrated by the contact center server 150 via any of the plurality of communication channels 120(1)-120(n).

Figure 3B:
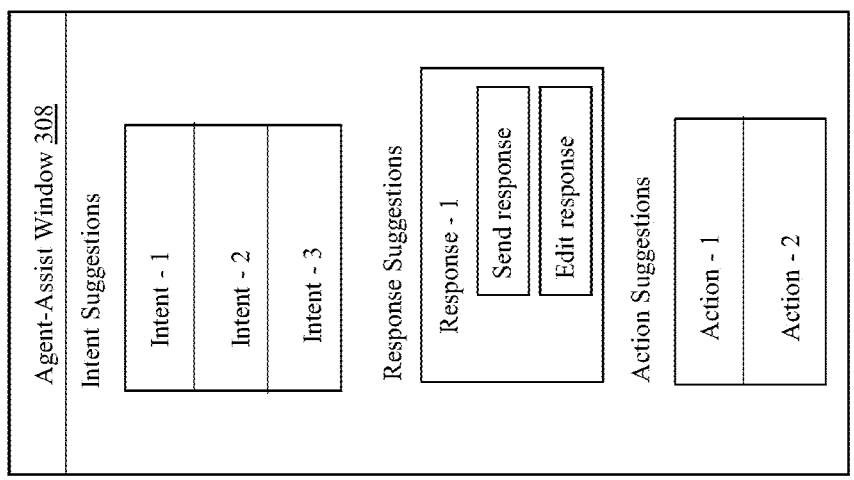
FIG. 3B is an example wireframe of an agent-assist window that is provided to the human agent in the graphical user interface.

FIG. 3B illustrates an example wireframe of an agent-assist window 308 that may be displayed in the agent device GUI 132. As illustrated in FIG. 3B, the agent-assist window 308 may display suggested—intents, responses, or actions provided by the contact center server 150 based on the conversation between the human agent and the customer. In one example, the human agent at one of the agent devices 130(1)-130(n) may ignore, use as-is, combine, or modify the suggested—intents, responses, or actions, when sending an agent response to the customer.

In one example, for an utterance—"Book me a flight ticket from Paris to London", an intent suggestion may be "book flight", a response suggestion may be a list of flights from Paris to London. When the customer completes the payment for the flight ticket, the action suggestion may be "Offer a travel plus credit card which provides more points per transaction". The human agent at one of the agent devices 130(1)-130(n) may use these suggestions to execute a dialog flow of a virtual assistant and/or to have effective conversations with the customers at one or more of the customer devices 110(1)-110(n).

In one example, the human agent at one of the agent devices 130(1)-130(n) may directly send to the customer the one or more suggested responses provided by the virtual assistant platform 160. In another example, the human agent at one of the agent devices 130(1)-130(n) may modify and send to the customer the one or more suggested responses provided by the virtual assistant platform 160. In another example, the human agent at one of the agent devices 130(1)-130(n) may ignore the one or more suggested responses provided by the virtual assistant platform 160 and compose a new response in the compose bar 312 of the conversation window 306 and send the new response to the customer (in some examples via the contact center server 150).

Figure 3C:
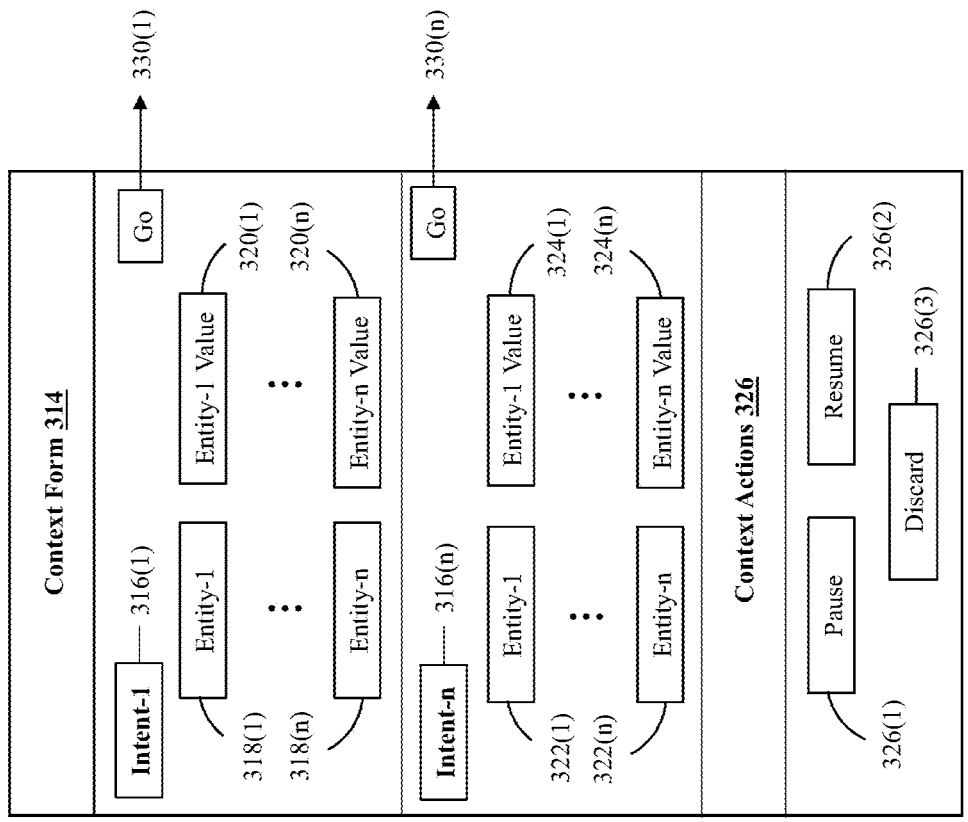
FIG. 3C is an example wireframe of a context form that is provided to the human agent in the graphical user interface.

FIG. 3C illustrates an example wireframe of the context form 314 displayed in the agent device GUI 132. The contact center server 150 may output to the plurality of agent devices 130(1)-130(n)—the one or more intents, one or more entities corresponding to the one or more intents, and one or more entity values corresponding to the one or more entities that are captured from the utterance of the customer, which are populated in the context form 314. The context form 314 may include user interface (UI) components to render: one or more intents 316(1)-316(n), one or more entities 318(1)-318(n) corresponding to an intent-1, one or more entity values 320(1)-320(n) corresponding to the one or more entities 318(1)-318(n), one or more entities 322(1)-322(n) corresponding to an intent-n, one or more entity values 324(1)-324(n) corresponding to the one or more entities 322(1)-322(n), "go" user interface components 330(1), 330(n) corresponding to the intent-1, intent-n respectively, a context actions area 326 that may include a pause action 326(1), a resume action 326(2), and a discard action 326(3). It may be understood that the context form 314 may include other types and/or numbers of information in other configurations.

The human agent at one of the agent devices 130(1)-130(n) may monitor conversations handled by the plurality of virtual assistants 164(1)-164(n) using the context form 314. In one example, the human agent at one of the agent devices 130(1)-130(n) may view or modify the intents (e.g. intent names), entities (e.g. entity names), or entity values captured from customer conversations using the UI components. The human agent at one of the agent devices 130(1)-130(n) may view or modify the one or more intents 316(1)-316(n), one or more entities 318(1)-318(n), one or more entity values 320(1)-320(n), one or more entities 322(1)-322(n), one or more entity values 324(1)-324(n). In another example, the human agent at one of the agent devices 130(1)-130(n) may modify virtual assistant execution or retrieve information using the "go" user interface components 330(1)-330(n). In another example, the human agents at one or more of the agent devices 130(1)-130(n) may pause or resume virtual assistant execution using the pause action 326(1) or the resume action 326(2). In another example, the human agents at one or more of the agent devices 130(1)-130(n) may discard the intent and entities captured using the discard action 326(3). In another example, the human agent at one of the agent devices 130(1)-130(n) may view or modify the information captured by the contact center server 150 corresponding to the customer conversation using the context form 314.

In one example, the agent device GUI 132, based on the instructions received from the contact center server 150, may provide or render options for the human agent at one of the one or more agent devices 130(1)-130(n) to select or specify execution of the one or more intents 316(1)-316(n) individually or simultaneously for example, using the context form 314. The agent device GUI 132 may also provide options for the human agent at one of the one or more agent devices 130(1)-130(n) to specify or define an order of execution of the one or more intents 316(1)-316(n), for example, using the context form 314. The one or more agent devices 130(1)-130(n) may output the specified order of execution to the contact center server 150. Subsequently, the contact center server 150 may execute the one or more intents 316(1)-316(n) in the specified order.

Figure 4:
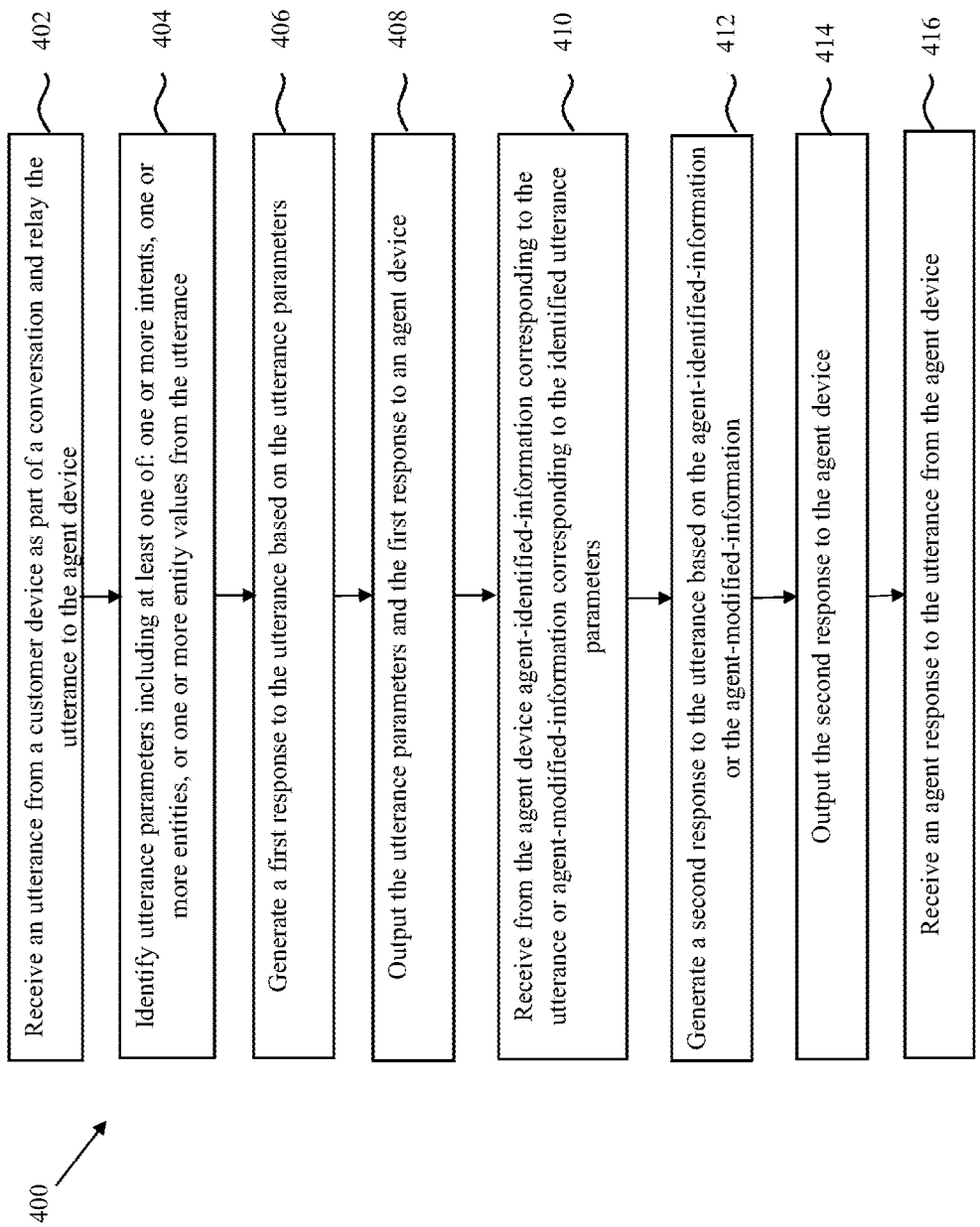
FIG. 4 is a flowchart of an exemplary method for handling customer conversations at a contact center server.

FIG. 4 illustrates a flowchart of an exemplary method 400 for handling customer conversations by the contact center server 150. In one example, the customer using the customer device 110(1) initiates a conversation with a virtual assistant 164(1) of the contact center server 150 using a social messenger 120(2) accessible in the customer device 110(1). It may be understood that, in this example, the social messenger 120(2) is configured as a channel of the virtual assistant 164(1). The virtual assistant 164(1) communicates with the customer device 110(1) and attempts to provide responses to the customer utterances. However, in this example, the virtual assistant 164(1) fails to resolve a customer issue and the contact center server 150 hands-off the conversation to the human agent operating the agent device 110(1). In one example, the routing engine 172 of the contact center server 150 hands-off the conversation to the agent device 110(1).

After the hand-off, the contact center server 150 relays the utterances received from the customer device 110(1) to the agent device 130(1). The contact center server 150 also monitors the conversation between the customer device 110(1) and the agent device 130(1), and suggests—responses, actions, or intents to the utterances to the agent device 130(1), although other types and/or numbers of suggestions may be provided in other configurations. The human agent operating the agent device 130(1) may view, send, combine or modify and send the suggestions to the customer using the agent device GUI 132.

The virtual assistant platform 160 of the contact center server 150 interprets the utterances received from the customer device 110(1) and provides response suggestions to the agent device 130(1). In one example, the virtual assistant platform 160 may use the NLP engine 162 and the agent-assist 168(1) of the virtual assistant 164(1) to provide the suggestions.

The exemplary method 400 describes, in particular, the communication between the customer (e.g customer device 110(1)), the contact center server 150, and the human agent (e.g. agent device 130(1)) after the conversation is handed-off to the human agent. The exemplary method 400 may be performed by the system components illustrated in the environment 100 of FIG. 1.

At step 402, the contact center server 150 receives an utterance from the customer device 110(1) as part of the conversation and relays the utterance to the agent device 130(1).

At step 404, the contact center server 150 may identify utterance parameters including at least one of: one or more intents, one or more entities (e.g. entity name, entity types), or one or more entity values, from the utterance. The NLP engine 162 of the contact center server 150 interprets the received utterance to identify the utterance parameters including: the one or more intents, the one or more entities, or the one or more entity values from the utterance. Subsequently, the contact center server 150 executes the dialog flow(s) of the identified one or more intents of the virtual assistant 164(1).

At step 406, the contact center server 150 generates a first response to the utterance based on the utterance parameters.

At step 408, the contact center server 150 outputs the utterance parameters and the first response to the agent device 130(1). In one example, the human agent at the agent device 130(1) may view the utterance parameters in the context form 314 and the first response in the agent-assist window 308. The human agent at the agent device 130(1) may also modify the utterance parameters using the context form 314. Based on the modified utterance parameters, the virtual assistant platform 160 of the contact center server 150 may re-execute a dialog flow of any of the intents of the virtual assistant 164(1). In one example, the human agent at the agent device 130(1) may modify an intent of the utterance in the context form 314, and based on the modified intent the virtual assistant platform 160 of the contact center server 150 may execute the dialog flow of the modified intent.

The human agent at the agent device 130(1) may also review the conversation in the conversation transcript area 310, identify and add any utterance parameters to the context form 314 that the virtual assistant platform 160 failed to capture. In one example, the human agent at the agent device 130(1), after reviewing the conversation, may identify that the virtual assistant platform 160 failed to capture an entity, and the entity value from the utterance and add the identified entity and entity value to the context form 314.

In one example, the human agent at the agent device 130(1) may select the pause 326(1) context action before adding or modifying any information in the context form 314. Upon the human agent at the agent device 130(1) selecting the pause 326(1) context action, the virtual assistant platform 160 may pause the execution of the virtual assistant 164(1). After adding or modifying the information in the context form 314, the human agent at the agent device 130(1) may select the resume 326(2) context action or the "go" user interface component 330(1). Upon the human agent at the agent device 130(1) selecting the resume 326(2) context action or the or the "go" user interface component 330(1), the virtual assistant platform 160 may resume the execution of the virtual assistant 164(1).

The human agent at the agent device 130(1) may use the first response suggested by the contact center server 150 in the conversation. In one example, the human agent at the agent device 130(1) may send the first response suggested by the contact center server 150 as-is to the customer device 110(1). In another example, the human agent at the agent device 130(1) may modify the first response suggested by the contact center server 150 and send the modified first response to the customer device 110(1).

The agent-identified-information (e.g. identified intent, entity or entity values previously not captured by the virtual assistant platform 160) corresponding to the utterance or the agent-modified-information (e.g. intent, entity or entity values previously captured by the virtual assistant platform 160 and modified by the human agent at the agent device 130(1)) corresponding to the identified utterance parameters may be output to the contact center server 150. The agent-identified-information or the agent-modified-information may be output by the agent device 130(1) to the contact center server 150 automatically or upon the direction of the human agent at the agent device 130(1).

At step 410, the contact center server 150 receives from the agent device 130(1) in the example the agent-identifiedinformation corresponding to the utterance or agent-modified-information corresponding to the identified utterance parameters. In one example, the human agent at the agent device 130(1) may not use the first response suggested by the contact center server 150, and provide agent-identified-information or agent-modified-information in the context form 314, and direct the contact center server 150 to provide a second response based on the agent-identified-information or the agent-modified-information. The human agent at the agent device 130(1) may select, for example, the "go" user interface component 330(1) to direct the contact center server 150 to provide the second response.

At step 412, the contact center server 150 generates the second response to the utterance based on the agent-identified-information or the agent-modified-information.

At step 414, the contact center server 150 outputs the second response to the agent device 130(1). Subsequently, the human agent at the agent device 130(1) may create an agent response which includes the second response, or a combination of the first response and second response, although other types and/or numbers of information may be included in other configurations. In one example, the human agent at the agent device 130(1) may edit the first response, the second response, or combine the first response and the second response to create the agent response. The agent response is a response to the utterance received from the customer device 110(1) at step 402. The agent response may be sent from the agent device 130(1) to the customer device 110(1) via contact center server 150. In some examples, the agent response may also be sent directly from the agent device 130(1) to the customer device 110(1).

At step 416, the contact center server 150 receives the agent response to the utterance from the agent device 130(1). The contact center server 150 may train an artificial intelligence based model, such as a predictive model, a machine learning model, or a language model, of the virtual assistant 164(1) based on the agent response, although other types of models may be trained. In one example, the artificial intelligence based model may be trained using utterance-agent response pairs. In another example, the usage of the first response, the second response, or the manner in which the first response and the second response are combined by the human agent at one of the agent devices 130(1)-130(n) may be used to train the artificial intelligence model.

Figure 5:
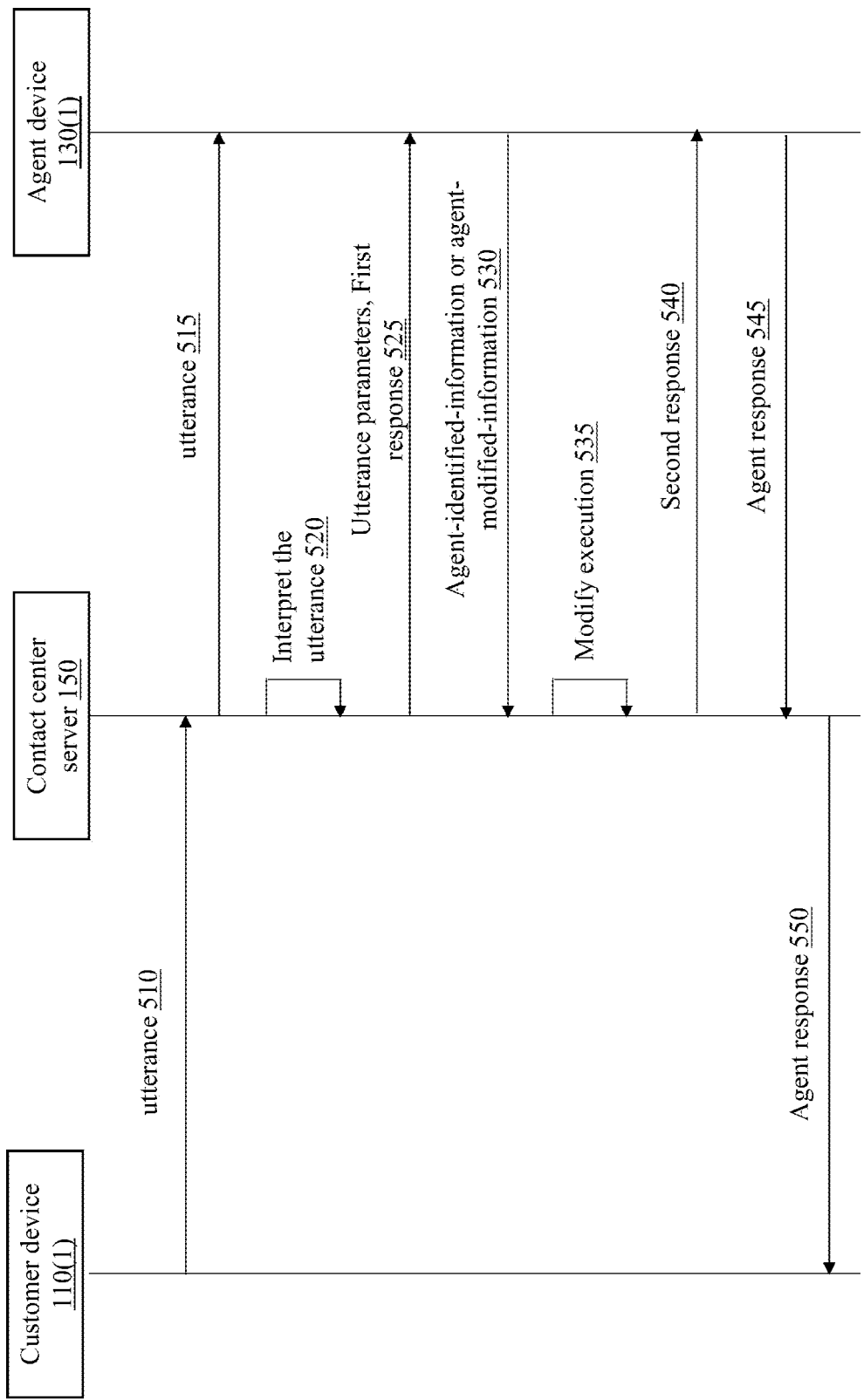
FIG. 5 is a sequence diagram illustrating an exemplary method for orchestrating a conversation between the customer and the human agent.
Figure 6A:
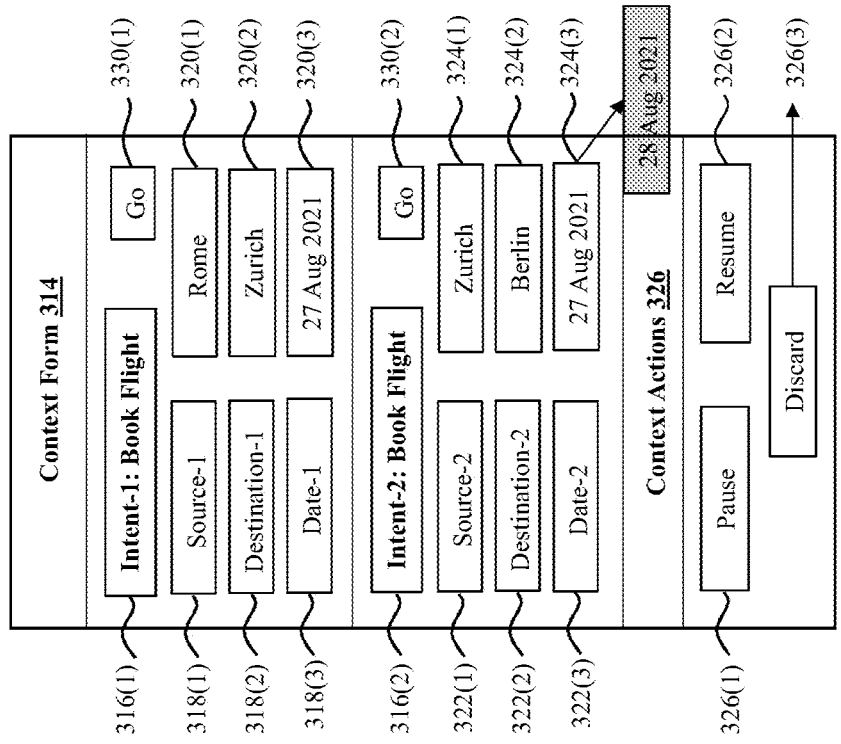
FIGS. 6A-6B illustrate an example conversation between the customer and the human agent as viewed in the graphical user interface orchestrated using the exemplary method of FIG. 5.
Figure 6A:
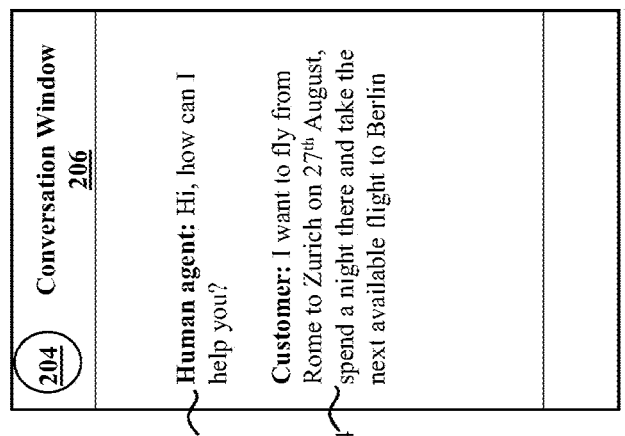
Figure 6B:
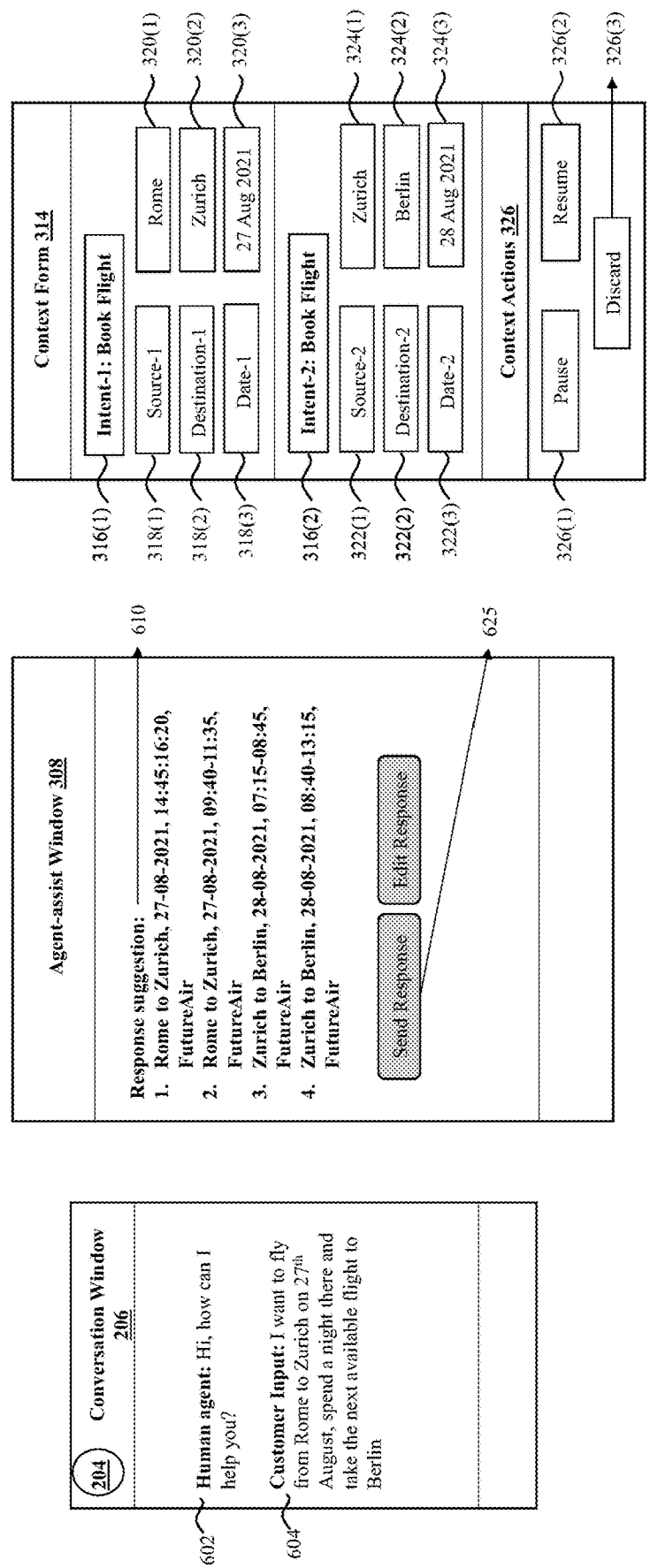

FIG. 5 is a sequence diagram illustrating an exemplary method for orchestrating a conversation between the customer at one of the customer devices 110(1)-110(n) and the human agent at one of the agent devices 130(1)-130(n). The sequence diagram in this example illustrates communication between the customer device 110(1), the contact center server 150, and the agent device 130(1) as part of a conversation. FIGS. 6A-6B illustrate an example conversation between the customer and the human agent as viewed in the agent device GUI 132 orchestrated using the exemplary method of FIG. 5. First, at step 510, the customer, using the customer device 110(1), sends an utterance 604 to the contact center server 150. At step 515, the contact center server 150 relays the utterance 604 to the agent device 130(1).

At step 520, the contact center server 150 uses a copy of the utterance 604 to interpret the utterance 604 and determine the utterance parameters of the utterance 604. The utterance parameters in this example include: the intents— "book flight" 316(1), 316(2) (described below in further detail with reference to FIG. 7), the entities—source-1 318(1), destination-1 318(2), date-1 318(3), source-2 322(1), destination-2 322(2), date-2 322(3), and the one or more entity values (320(1)-320(3), 324(1)-324(3)) of the one or more entities from the utterance. The contact center server 150, after determining that the customer would like to book two flight tickets from the utterance, executes the "book flight" intents 316(1), 316(2)—firstly based on the entity values of—source-1 318(1), destination-1 318(2), date-1 318(3), and secondly based on the entity values of—source-2 322(1), destination-2 322(2), date-2 322(3), provided in the utterance, and generates a first response to the utterance 604.

At step 525, the virtual assistant platform 160 outputs the utterance parameters of the utterance 604 and the first response to the utterance 604. The contact center server 150 outputs the utterance parameters of the utterance 604 and the first response to the agent device 130(1).

The first response serves as a suggestion to the human agent to respond to the utterance 604 provided by the customer. Thereby, the contact center server 150 assists the human agent at the agent device 130(1) in responding to the customer.

The agent device 130(1) receives utterance parameters of the utterance 604 and the human agent at the agent device 130(1) views the received utterance parameters—316(1), 316(2), 318(1)-318(3), 322(1)-322(3), 320(1)-320(3), 324(1)-324(3) of the utterance 604 and the first response to the utterance 604 as a response suggestion from the contact center server 150. The human agent at the agent device 130(1) determines that a part of the first response are not relevant to the utterance 604, as the customer would like to fly from Rome to Zurich on 27 Aug. 2021 and from Zurich to Berlin on 28 Aug. 2021. Accordingly, the human agent at the agent device 130(1) modifies the entity value of the entity "date-2" from 27 Aug. 2021 to 28 Aug. 2021 in the entity value field 324(3).

Subsequently, the human agent at the agent device 130(1) selects the "go" user interface component 330(2) to send, at step 530, the agent-modified-information (modified entity value) of the entity "date-2" 322(3) to the contact center server 150. In one example, the agent device 130(1) at step 530 also sends to the contact center server 150 an instruction to execute the "book flight" intent 316(2) with the agent-modified "date-2" entity 322(3) value.

At step 535, the contact center server 150 uses the agent-modified "date-2" entity 322(3) value and modifies the execution of the "book flight" intent 316(2). The modified execution of the "book flight" intent 316(2) uses the agent-modified "date-2" entity 322(3) value. In one example, at step 535, the "book flight" intent 316(1) may also be re-executed with the previously captured entities 318(1)-318(3) and entity values 320(1)-320(3).

In one example, the modification of execution may include the contact center server 150 discarding the existing "book flight" intent 316(2) execution, and re-executing the "book flight" 316(2) intent with the agent-modified "date-2" entity 322(3) value. In another example, the modification of execution may include the contact center server 150 re-executing the "book flight" intent 316(2) from a "date-2" entity node configured in the "book flight" intent 316(2). In another example, the modification of execution may include changing the "date-2" entity 322(3) value captured in the existing execution of the "book flight" intent 316(2) and continuing the execution of the "book flight" intent 316(2).

Based on the agent-modified-information, at step 540, the contact center server 150 provides a second response 620 in which the flights listed 3,4 are scheduled on 28 Aug. 2021.

At step 545, the agent device 130(1) outputs the second response 620 to the contact center server 150 upon the human agent selecting a "send response" user interface component 625.

At step 550, the contact center server 150 outputs the second response 620 to the customer device 110(1).

For further illustration, in another example, at step 525, the contact center server 150 may only send the utterance parameters and not send the first response. At step 530, the human agent at the agent device 130(1) may confirm the utterance parameters by selecting the "go" user interface component 330(1) or 330(2). At step 535 based on the confirmation, the contact center server 150 may execute an intent confirmed by the human agent at the agent device 130(1). In this example, the contact center server 150 receives a confirmation of the utterance parameters from the human agent before executing the intent.

It may be understood that the human agent uses the agent device GUI 132 rendered in the agent device 130(1) to view, identify or modify any information, although other types and/or numbers of actions may be performed in other configurations.

Figure 7:
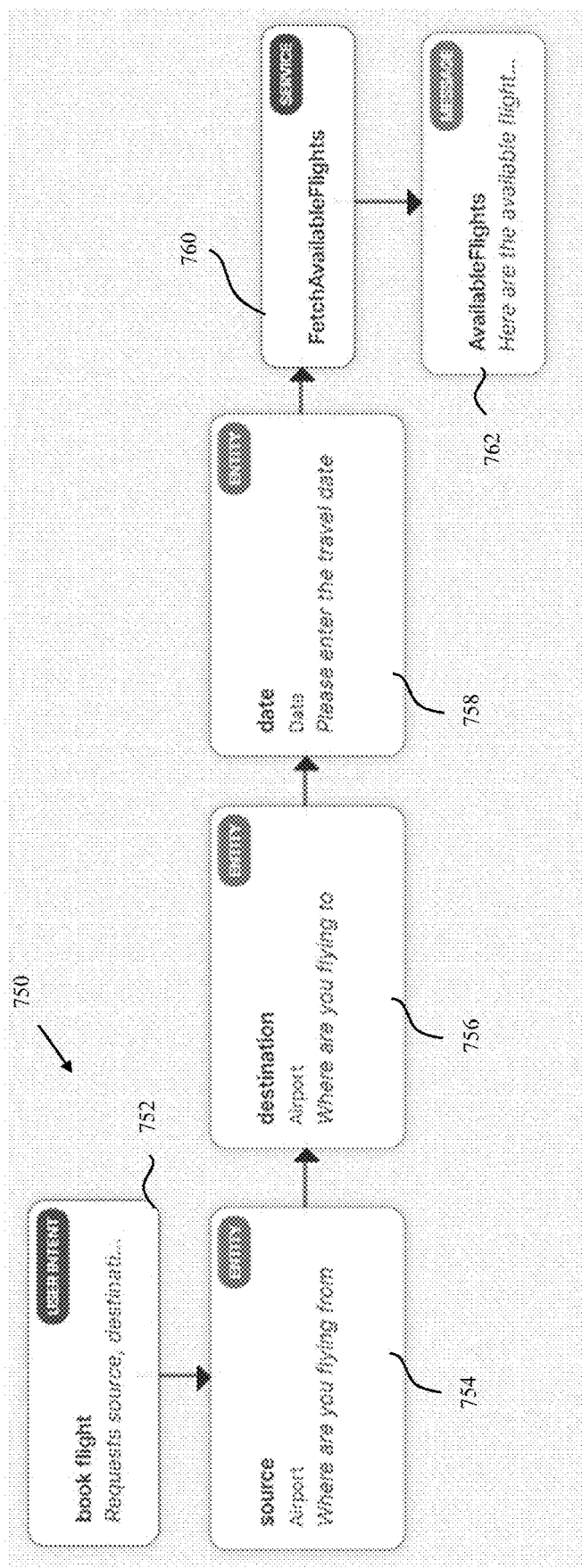
FIG. 7 is an example "book flight" intent of a travel virtual assistant configured by an enterprise user using the virtual assistant platform of the contact center server.

FIG. 7 illustrates an example dialog flow of a "book flight" intent 750 of a travel virtual assistant configured by an enterprise user using the virtual assistant platform 160 of the contact center server 150.

The enterprise user may use user interface (UI) components, code, or a combination of these provided by the virtual assistant platform 160 to create and configure virtual assistants, although other types and/or numbers of methods may be used in other configurations. Each virtual assistant may include one or more intents and each intent may be configured using UI components such as nodes. The types of nodes provided by the virtual assistant platform 160 include: an intent node, an entity node, a service node, a message node, and/or a confirmation node, although other types and/or numbers of nodes may be added in other configurations. The enterprise user may configure the virtual assistant by connecting and configuring multiple nodes. The intent of the utterance refers to the intention of the customer—that describes what the customer wants the virtual assistant to do. The entities are, for example, parameters, fields, data, or words required by the virtual assistant to fulfill the intent. For example, in the utterance—"Book me a flight to Orlando for next Sunday", the intent is "Book flight", and the entities are "Orlando" and "Sunday."

The "book flight" intent 750 is configured using nodes such as intent node—book flight 752, entity nodes—source 754, destination 756, date 758, a service node—FetchAvailableFlights 760, and a message node—AvailableFlights 762. The virtual assistant platform 160 traverses the above-mentioned nodes when the "book flight" intent 750 is determined in the utterance provided by the customer.

The entities—source 754 and destination 756 may be of the entity type—city. The entity—date 758 may be of the entity type—date. The entity nodes are configured to determine a configured entity type and a corresponding entity value from the utterance. The service node—FetchAvailableFlights 760 is configured to make an API call to an internal repository or an external service such as, for example, a travel website, to fetch information about available flights between the source 754 and the destination 756 on the date 758. The message node—AvailableFlights 762 is configured to output information (in this example information retrieved by the API call).

The API calls may be used by the contact center server 150 to retrieve information based on the utterances provided by the customers at one or more of the customer devices 110(1)-110(n) and present response suggestions to the human agent. In one example, the contact center server 150 may request a confirmation of the utterance parameters before executing the API call. The agent device 130(1) may receive the utterance parameters from the contact center server 150 and the agent device 130(1) may display the utterance parameters in the context form 314 of the agent device GUI 132. The human agent at the agent device 130(1) may confirm the utterance parameters detected in the utterance by the contact center server 150 by, for example, selecting the "go" user interface component 330(1) or 330(2). Upon receiving the confirmation of the utterance parameters from the agent device 130(1), the contact center server 150 executes the API call. This confirmation from the human agent at the agent device 130(1) improves the accuracy of the information retrieved by the contact center server 150 and reduces the number of volleys of conversation required to provide an accurate suggestion.

In another example, the contact center server 150 may detect multiple intents from an utterance. The human agent at the agent device 130(1) may provide confirmation of the utterance parameters corresponding to one or more of the multiple intents which may require an API call. In another example, the contact center server 150 may not require any confirmation from the human agent before executing an API call. In one example, the contact center server 150 may determine an order of execution of the multiple intents identified in the utterance. The contact center server 150 upon analyzing an utterance, may determine that an intent-1 316(1) may be executed first, and an intent-2 316(2) may be executed subsequently as a followup intent. The order of execution may be determined based on the utterance. For example, the contact center server 150 may determine that the utterance—"Book me a flight to San Diego and book a cab to Sea World", includes two intents "book flight" and "book cab", and also determine that "book flight" intent may be executed first, and the "book cab" intent may be executed subsequently as a followup intent. Accordingly, the contact center server 150 may output instructions to the agent device 130(1) to populate the intents—"book flight" and "book cab", for example, in the context form 314 as illustrated in FIG. 8E.

In another example, the agent device GUI 132 may enable the human agent at the agent device 130(1) to combine information retrieved from multiple API calls and compose the agent response 545. The contact center server 150 may train one or more artificial intelligence based models, such as a predictive model, a machine learning model, or a language model, based on how the human agent at one of the agent devices 130(1)-130(n) composes a response to the utterance by combining information retrieved from multiple API calls. The context form 314 enables the human agent at one of the agent devices 130(1)-130(n) to quickly understand the information provided by the customer and the information required to fulfill the intent of the customer.

Figure 8A:
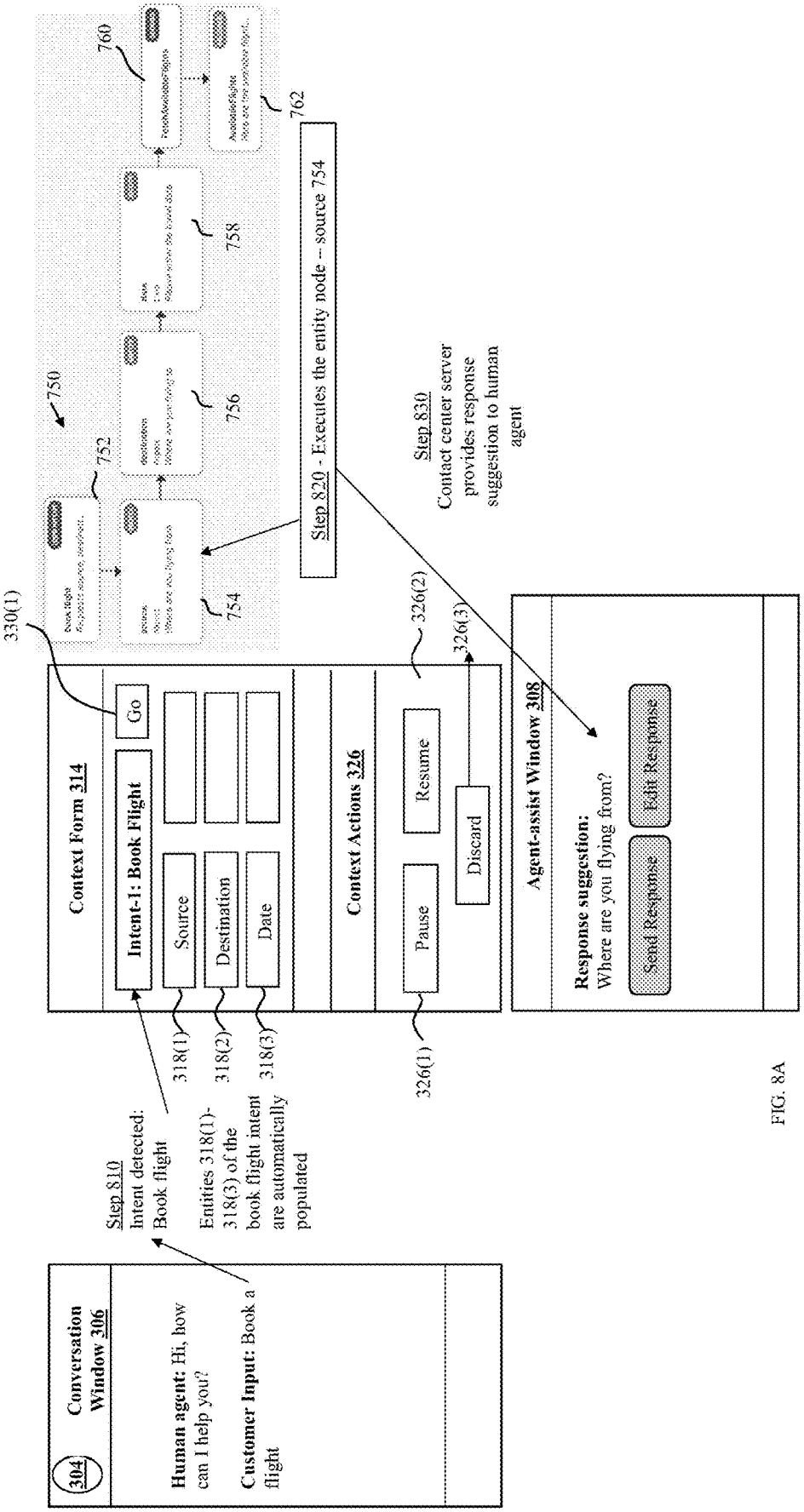
FIGS. 8A-8F include examples of wireframes of the graphical user interface that are provided to a human agent and screenshots of the intents executed by the contact center server.
Figure 8B:
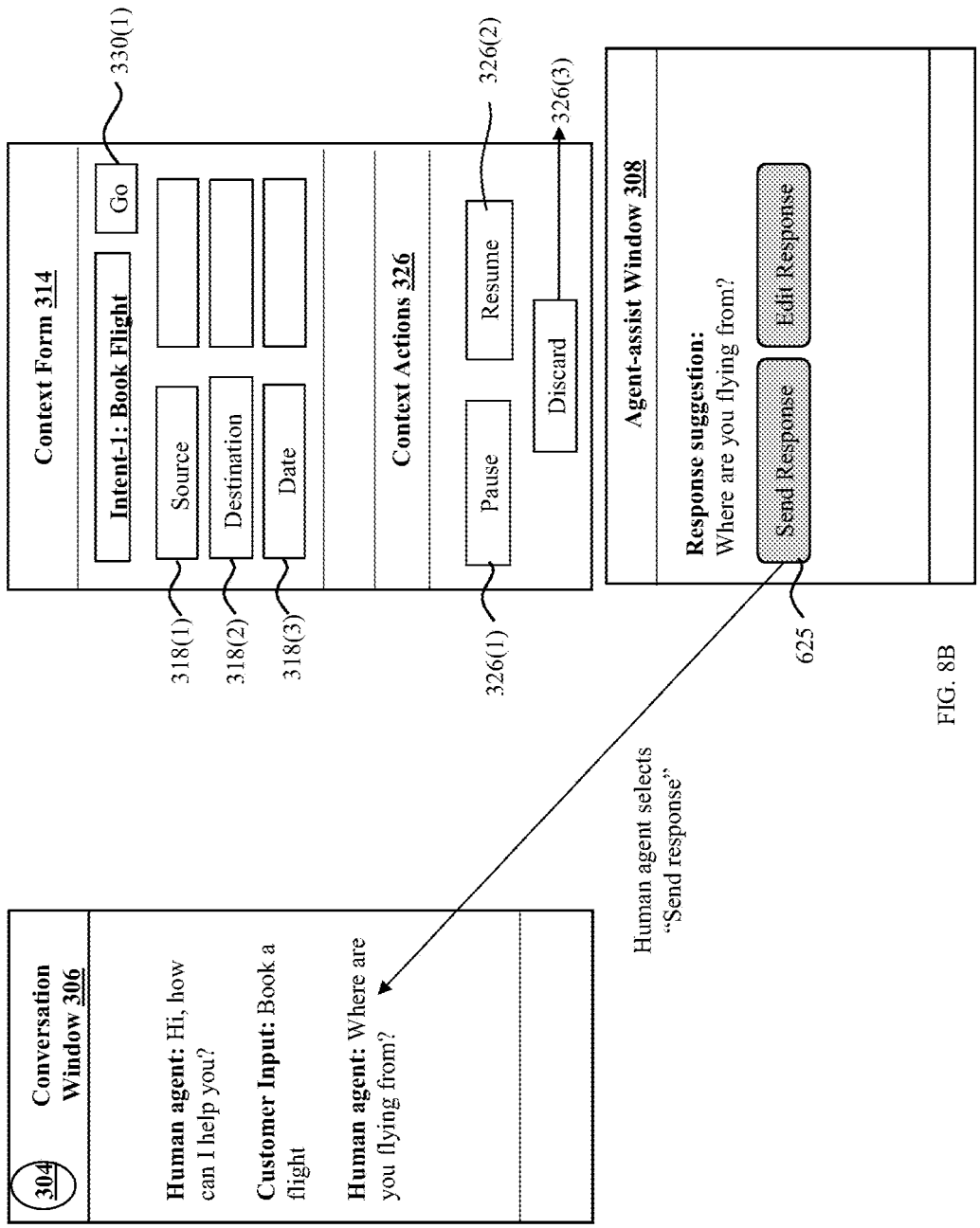
Figure 8C:
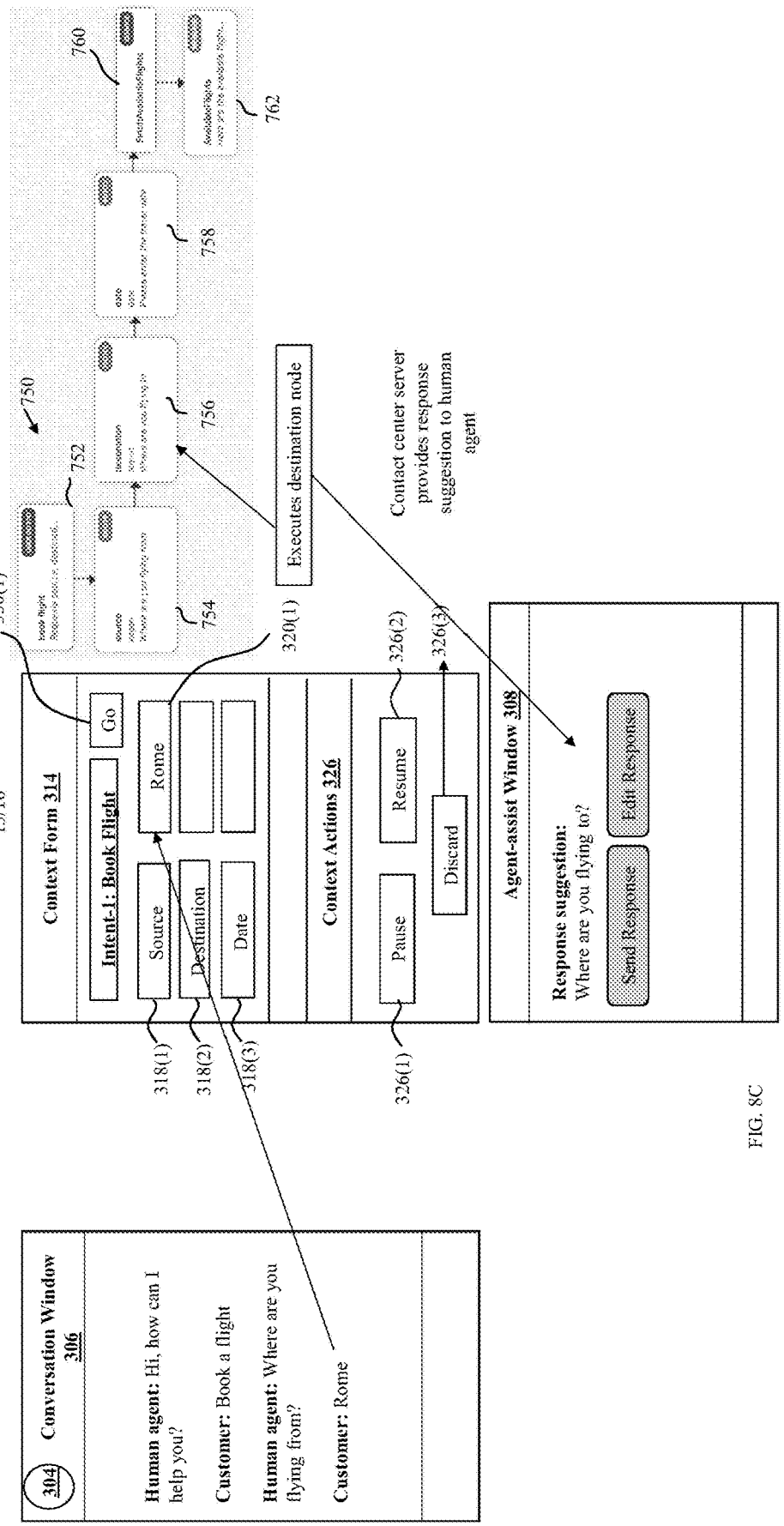
Figure 8D:
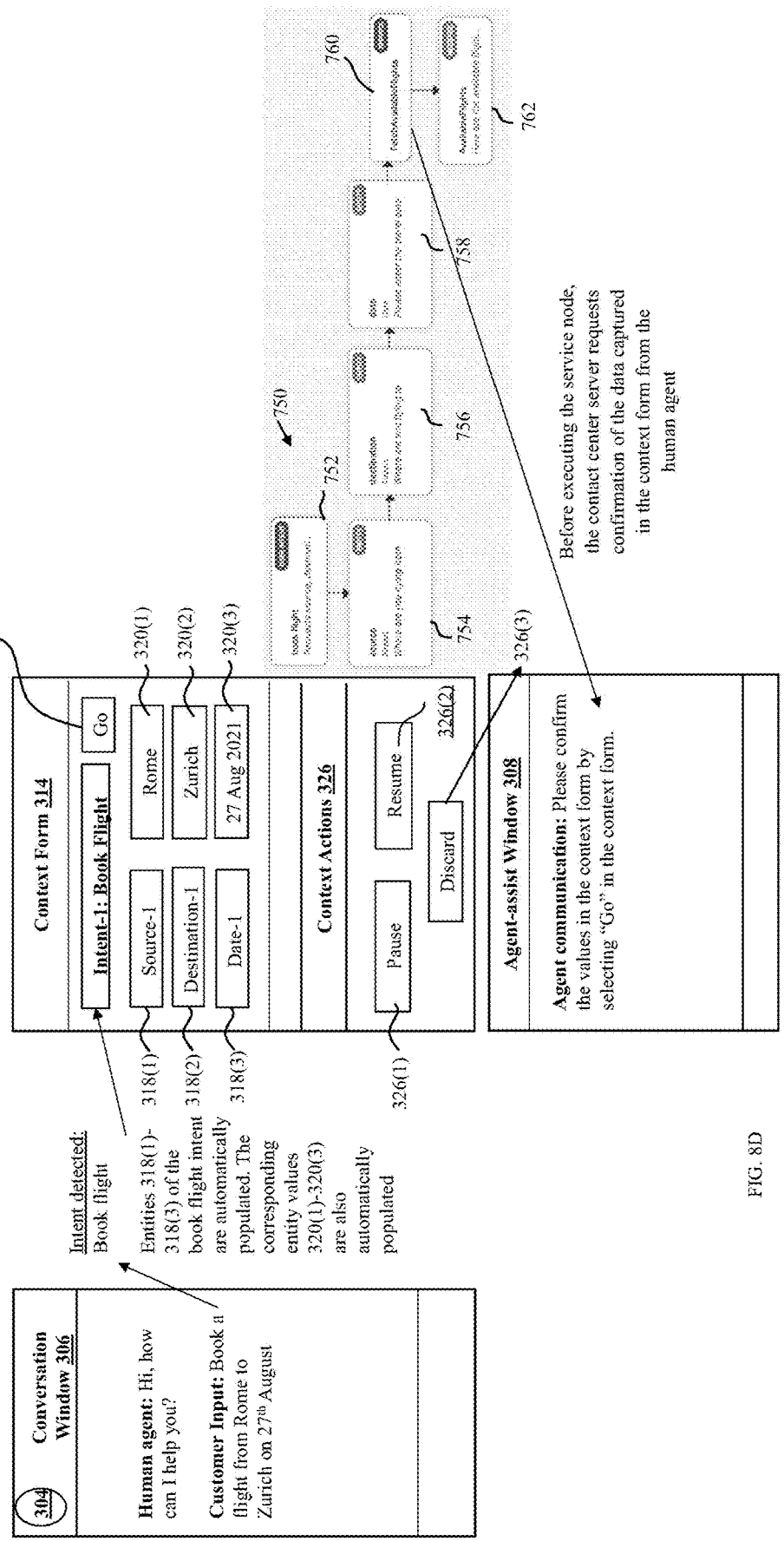
Figure 8E:
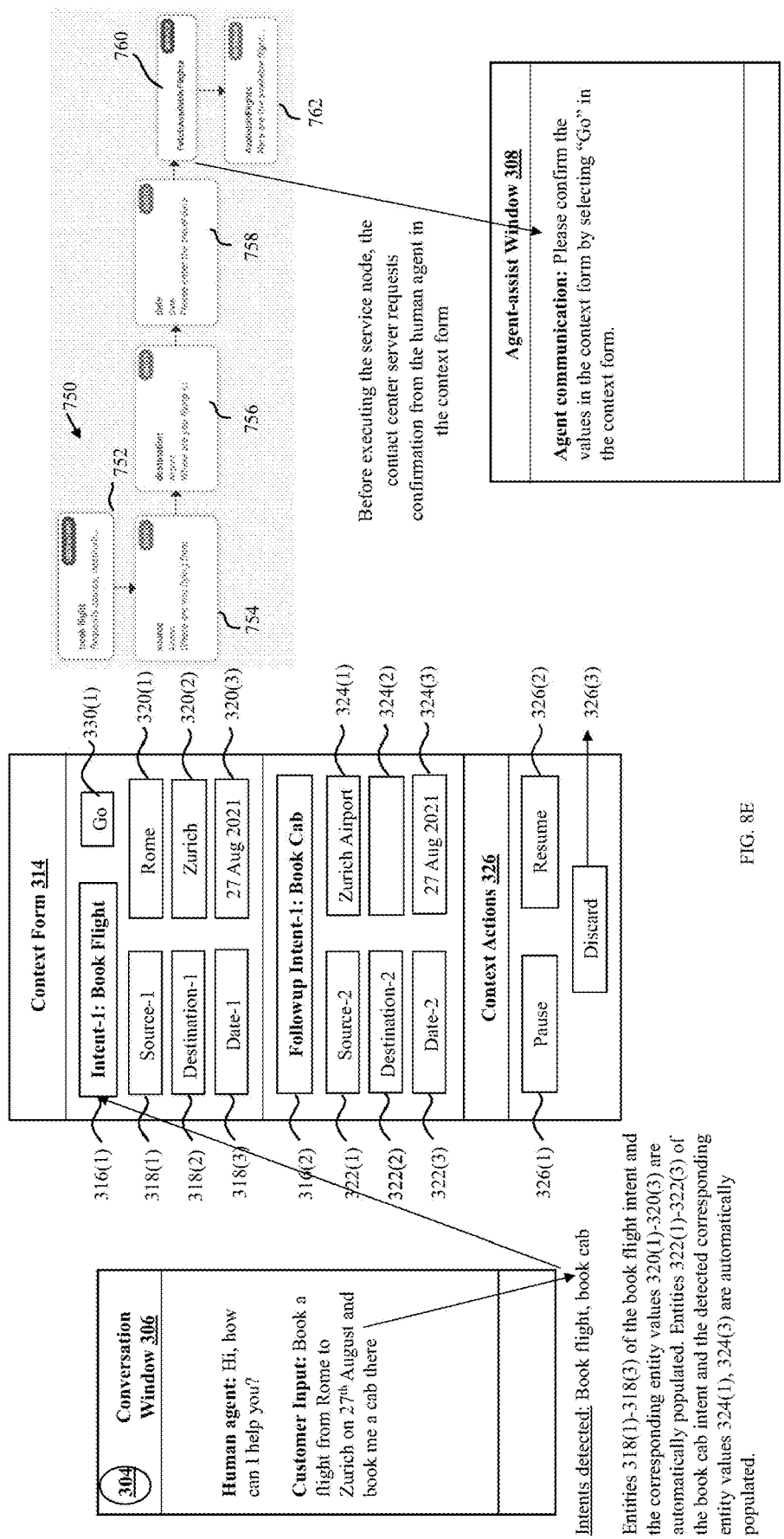

FIGS. 8A-8F include example wireframes of the graphical user interface that is provided to a human agent at one of the agent devices 130(1)-130(n) and screenshots of the intents executed by the contact center server 150. In FIG. 8A, the contact center server 150 receives a first customer utterance—"book a flight", and at step 810 detects the intent of the first customer utterance as "book flight" intent 750. Upon detecting the intent, the contact center server 150 starts executing the "book flight" intent 750 and automatically outputs the entities required to fulfill the "book flight" intent 750 to the agent device 130(1) which populates the entities in the context form 314. At step 820, the contact center server 150 executes the entity node—source 754, and at step 830 the contact center server 150 provides a response suggestion to the agent device 130(1) in this example. In this example, the response suggestion is the prompt configured in the entity node—source 754.

As illustrated in FIG. 8B, the human agent at the agent device 130(1) selects the "send response" UI component 625, upon which the agent device 130(1) sends the response suggestion to the customer device 110(1) via the contact center server 150.

As illustrated in FIG. 8C, upon receiving a second utterance—"where are you flying from", the customer responds with "Rome"—which is sent to the contact center server 150 by the customer device 110(1). The contact center server 150 determines that "Rome" is an entity value corresponding to the entity node—source 754 and outputs "Rome" to the agent device 130(1). The agent device 130(1) displays the entity value 320(1)—"Rome" in the context form 314, and "Rome" as the customer response in the conversation window 306. This enables the human agent at the agent device 130(1) to quickly understand that the entity value for the entity node—source 754 is captured and the entity values for the entity nodes—destination 756, and date 758 should be captured to fulfill the "book flight" intent 750. Subsequently, the contact center server 150 executes the entity node—destination 756 and provides another response suggestion—"where are you flying to?", which is an entity prompt of the entity node—destination 756, to the agent device 130(1). The human agent may send the response suggestion—"where are you flying to?" as-is to the customer device 110(1). The human agent at the agent device 130(1) may edit the response suggestion—"where are you flying to?" before sending this response suggestion to the customer device 110(1). In this manner, the contact center server 150 continues to execute the "book flight" intent 750 to assist the human agent at the agent device 130(1).

As illustrated in FIG. 8D, the customer provides a third utterance—"Book a flight from Rome to Zurich on 27th August". The customer device 110(1) sends the utterance to the contact center server 150 which relays the utterance to the agent device 130(1). The contact center server 150 also interprets the third utterance and determines that the intent of the third utterance is—"book flight" intent 750. Upon detecting the intent, the contact center server 150 starts executing the "book flight" intent 750 and automatically outputs the entities, entity values required to fulfill the "book flight" intent 750 to the agent device 130(1) which populates the entities 318(1)-318(3) in the context form 314 and populates the entity values 320(1)-320(3) in the context form 314 respectively. In this example, as the customer provided the entity values for the entities—source 754, destination 756, and date 758, the execution of the "book flight" intent 750 reaches the service node 760. The contact center server 150 before executing the service node 760, which is configured to make an API call to fetch the flight details based on the utterance, provides an agent communication—"Please confirm the values in the context form by selecting "Go" in the context form" to the agent device 130(1). The human agent at the agent device 130(1) views the agent communication in the agent-assist window 308 and as the entities and entity values are accurately captured by the contact center server 150, selects the "go" user interface component 330(1) in the context form 314. Subsequently, the contact center server 150 executes the API call configured in the service node 760 using the entity values provided by the customer. In this manner, the contact center server 150 requests confirmation from the human agent at the agent device 130(1) before executing an API call to ensure accuracy.

As illustrated in FIG. 8E, the customer provides a fourth utterance—"Book a flight from Rome to Zurich on 27th August and book me a cab there". The customer device 110(1) sends the fourth utterance to the contact center server 150 which relays the fourth utterance to the agent device 130(1). The contact center server 150 also interprets the fourth utterance and determines that the intent of the utterance is—"book flight" intent 750 and a followup intent of the fourth utterance is—"book cab". The contact center server 150 executes the followup intent after executing the intent. The contact center server 150 starts executing the "book flight" intent 750 and automatically outputs the entities, entity values required to fulfill the "book flight" intent 750 to the agent device 130(1) which populates the entities 318(1)-318(3), 322(1)-322(3) in the context form 314, and populates the entity values 320(1)-320(3), 324(1)-324(3) in the context form 314 respectively. In this example, as the customer provided the entity values for the entities—source 754, destination 756, and date 758, the execution of the "book flight" intent 750 reaches the service node 760. The contact center server 150 before executing the service node 760, which is configured to make an API call to fetch the flight details based on the utterance, provides an agent communication—"Please confirm the values in the context form by selecting "Go" in the context form" to the agent device 130(1).

Figure 8F:
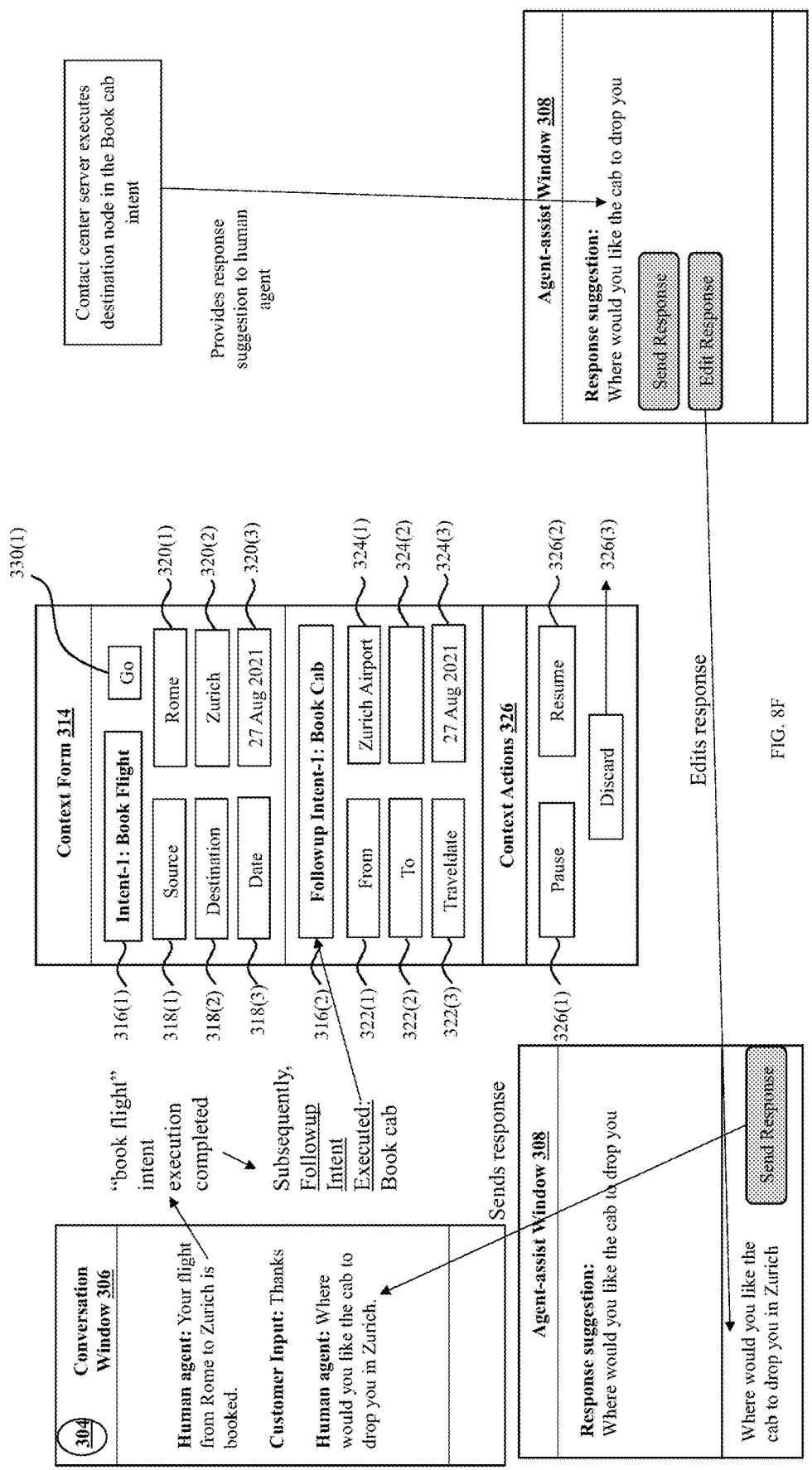

As illustrated in FIG. 8F, the contact center server 150 after executing the "book flight" intent 750, executes the "book cab" intent. The "book cab" intent may also have entities—From, To, Traveldate to book the cab. As the "From" entity value is detected in the fourth utterance by the contact center server 150, the contact center server 150 executes the "To" entity node in the "book cab" intent and provides a response suggestion—"where would you like the cab to drop you" to the agent device 130(1). The human agent at the agent device 130(1) may view this response suggestion in the agent-assist window 308, and edit the response suggestion as "Where would you like the cab to drop you in Zurich" and send the response to the customer device 110(1) via the contact center server 150. After the customer provides the value for the "To" entity, as the "Traveldate" entity value is already captured by the contact center server 150, the contact center server 150 requests the human agent to confirm the entities and entity values captured. In this manner, the contact center server 150 continues the execution of the followup intent—"book cab". The contact center server 150 assists the human agent by outputting the utterance parameters including: the intents, entities, and entity values provided by the customer. The agent device 130(1) displays the utterance parameters in the context form 314 which enables the human agent to advantageously view, understand, modify the intents, entities, or entity values provided by the customer. Also, the human agent at the agent device 130(1) may view, edit, combine, and/or send the response suggestions provided by the contact center server 150 in the agent-assist window 308.

Having thus described the basic concept of the invention, it will be rather apparent to those skilled in the art that the foregoing detailed disclosure is intended to be presented by way of example only, and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
receiving, by a contact center server, an utterance from a customer device as part of a conversation;
identifying, by the contact center server, utterance parameters of the utterance;
generating, by the contact center server, a first response to the utterance based on the utterance parameters;
outputting, by the contact center server, the utterance parameters and the first response to an agent device;
receiving, by the contact center server, from the agent device agent-identified-information corresponding to the utterance or agent-modified-information corresponding to the utterance parameters;
generating, by the contact center server, a second response to the utterance based on the agent-identified-information or the agent-modified-information; and
outputting, by the contact center server, the second response to the agent device.

2. The method of claim 1, further comprising:
receiving, by the contact center server, from the agent device an agent response which includes the second response, or a combination of the first response and second response;
outputting, by the contact center server, the agent response to the customer device; and
training, by the contact center server, an artificial intelligence based model based on the agent response.

3. The method of claim 1, wherein the utterance parameters include at least one of: one or more intents, one or more entity types, or one or more entity values.

4. The method of claim 1, wherein the agent-identified-information comprises one or more agent-identified utterance parameters of the utterance.

5. The method of claim 1, wherein the agent-modified-information comprises a modification of one or more of the utterance parameters of the utterance.

6. The method of claim 1, wherein the second response includes at least part of the first response.

7. The method of claim 1, wherein the first response or the second response comprise: an intent suggestion, a response suggestion, or action suggestion.

8. A contact center server comprising:
a processor; and
a memory coupled to the processor which is configured to be capable of executing programmed instructions stored in the memory to:
receive an utterance from a customer device as part of a conversation;
identify utterance parameters of the utterance;
generate a first response to the utterance based on the utterance parameters;
output the utterance parameters and the first response to an agent device;
receive from the agent device agent-identified-information corresponding to the utterance or agent-modified-information corresponding to the utterance parameters;
generate a second response to the utterance based on the agent-identified-information or the agent-modified-information; and
output the second response to the agent device.

9. The contact center server of claim 8, wherein the processor is further configured to:
receive from the agent device an agent response which includes the second response, or a combination of the first response and second response;
output the agent response to the customer device; and
train an artificial intelligence based model based on the agent response.

10. The contact center server of claim 8, wherein the utterance parameters include at least one of: one or more intents, one or more entity types, or one or more entity values.

11. The contact center server of claim 8, wherein the agent-identified-information comprises one or more agent-identified utterance parameters of the utterance.

12. The contact center server of claim 8, wherein the agent-modified-information comprises a modification of one or more of the utterance parameters of the utterance.

13. The contact center server of claim 8, wherein the second response includes at least part of the first response.

14. The contact center server of claim 8, wherein the first response or the second response comprise: an intent suggestion, a response suggestion, or action suggestion.

15. A non-transitory computer-readable medium having stored thereon instructions for managing customer conversations which when executed by a processor, causes the processor to:
receive an utterance from a customer device as part of a conversation;
identify utterance parameters of the utterance;
generate a first response to the utterance based on the utterance parameters;
output the utterance parameters and the first response to an agent device;
receive from the agent device agent-identified-information corresponding to the utterance or agent-modified-information corresponding to the utterance parameters;
generate a second response to the utterance based on the agent-identified-information or the agent-modified-information; and
output the second response to the agent device.

16. The non-transitory computer-readable medium of claim 15, wherein the executable instructions when executed by the processor further causes the processor to:
receive from the agent device an agent response which includes the second response, or a combination of the first response and second response;
output the agent response to the customer device; and
train an artificial intelligence based model based on the agent response.

17. The non-transitory computer-readable medium of claim 15, wherein the utterance parameters include at least one of: one or more intents, one or more entity types, or one or more entity values.

18. The non-transitory computer-readable medium of claim 15, wherein the agent-identified-information comprises one or more agent-identified utterance parameters of the utterance.

19. The non-transitory computer-readable medium of claim 15, wherein the agent-modified-information comprises a modification of one or more of the utterance parameters of the utterance.

20. The non-transitory computer-readable medium of claim 15, wherein the second response includes at least part of the first response.

21. The non-transitory computer-readable medium of claim 15, wherein the first response or the second response comprise: an intent suggestion, a response suggestion, or action suggestion.

* * * * *